US009131662B2

(12) United States Patent
VanDommelen

(10) Patent No.: US 9,131,662 B2
(45) Date of Patent: Sep. 15, 2015

(54) APPARATUS AND METHOD FOR CONTROLLING MULTIPLE LINES

(71) Applicant: Paulus VanDommelen, Sammamish, WA (US)

(72) Inventor: Paulus VanDommelen, Sammamish, WA (US)

(*) Notice: Subject to any disclaimer, the term of this patent is extended or adjusted under 35 U.S.C. 154(b) by 0 days.

(21) Appl. No.: 14/550,858

(22) Filed: Nov. 21, 2014

(65) Prior Publication Data

US 2015/0074946 A1 Mar. 19, 2015

Related U.S. Application Data

(62) Division of application No. 13/740,176, filed on Jan. 12, 2013.

(60) Provisional application No. 61/631,951, filed on Jan. 13, 2012.

(51) Int. Cl.
*A01K 27/00* (2006.01)

(52) U.S. Cl.
CPC .................. *A01K 27/003* (2013.01)

(58) Field of Classification Search
CPC .................................... A01K 27/03
USPC ......... D30/151, 153, 154; 119/795, 787, 791, 119/769, 770
See application file for complete search history.

(56) References Cited

U.S. PATENT DOCUMENTS

| D281,631 | S | * | 12/1985 | Konar | D30/153 |
|---|---|---|---|---|---|
| 4,563,981 | A | * | 1/1986 | Kramer | 119/770 |
| D298,478 | S | * | 11/1988 | Ticknor | D30/153 |
| 5,485,811 | A | * | 1/1996 | Jacobsen et al. | 119/798 |
| 5,852,988 | A | * | 12/1998 | Gish | 119/795 |
| 5,901,668 | A | * | 5/1999 | Goodger, Sr. | 119/795 |
| 6,019,067 | A | * | 2/2000 | Carey | 119/795 |
| 6,273,029 | B1 | * | 8/2001 | Gish | 119/792 |
| 6,827,045 | B1 | * | 12/2004 | Willner et al. | 119/795 |
| 7,325,515 | B2 | * | 2/2008 | Hetland | 119/795 |
| 7,757,639 | B1 | * | 7/2010 | Prendes | 119/772 |
| D688,424 | S | * | 8/2013 | Stanley et al. | D30/153 |
| 8,584,623 | B2 | * | 11/2013 | Kaitz et al. | 119/795 |
| 8,863,698 | B2 | * | 10/2014 | Romiluyi | 119/796 |

* cited by examiner

*Primary Examiner* — Yvonne Abbott-Lewis
(74) *Attorney, Agent, or Firm* — Patrick M. Dwyer

(57) ABSTRACT

A handle for walking dogs on three leashes and for untangling crossed leashes while walking. The handle has three leash attachment locations, and the three locations correspond roughly to the vertices of a triangle. Regardless of the shape of the handle, or the positioning of the leash attachment locations on the handle, three lines produced to connect the three leash attachment locations will form the sides of a triangle. There are three graspable handle grips, each handle grip interposed between two of the three leash attachment locations.

11 Claims, 11 Drawing Sheets

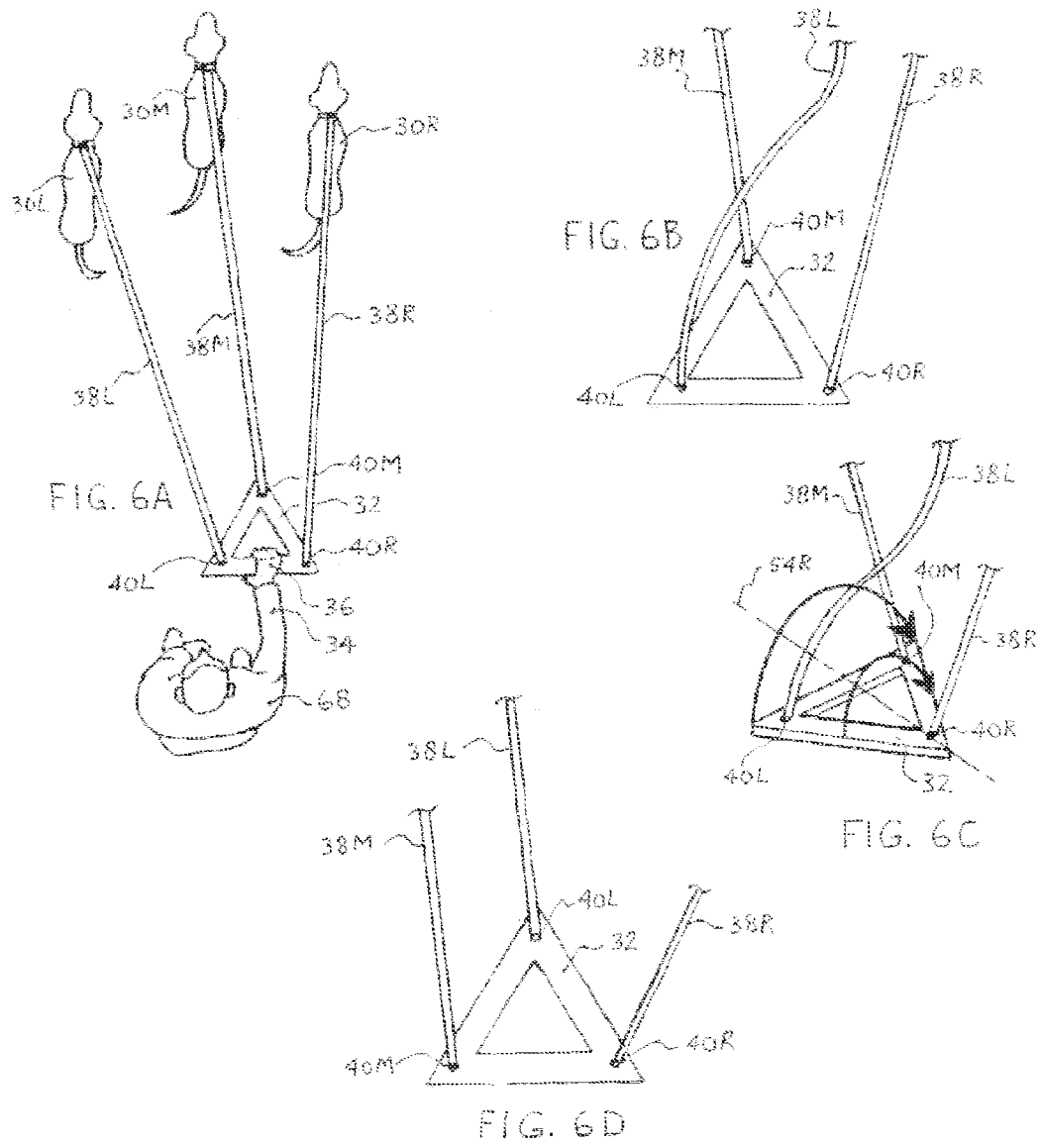

APPARATUS AND METHOD FOR CONTROLLING MULTIPLE LINES

This application claims priority to U.S. patent application Ser. No. 13/740,176 filed Jan. 12, 2013 which claimed priority to U.S. Provisional Patent Application 61/631,951 filed Jan. 13, 2012, both of which are herewith incorporated by this reference as if fully set forth herein.

TECHNICAL FIELD

This invention relates to an apparatus and method for controlling multiple lines; more particularly it relates to the manual handling of lines or leashes to resolve line entanglements, and to safely walking, guiding, controlling and untangling lines attached to multiple animals or persons.

BACKGROUND

Walking Two Dogs

The state of the art of walking and controlling two dogs with a single handle is well known. The basic idea is a single handle with a short extension leash that ends in a swivel snap hook attached to a two-leash coupler. Instead (or in addition) the two-leash coupler itself can have a swivel or other rotatable connector at its upper end. When a short length coupler is used, two normal length leashes can be attached to the coupler's lower ends and at the other ends with swivel snap hooks to dog collars or harnesses. This setup allows the dogs to roam freely within the leash length radius. Most two-dog setups however, also those available commercially, consist of a handle with a short extension and a swivel end, a shorter or normal leash in-between, then a short two-leash coupler. This setup keeps the two dogs close together and restricts their roaming space. Each dog can change position in the team of two and the swivel(s) will automatically untangle. There are many variations and patents for two-dog leash setups and they tend to work well due to the rotatable swivels. A swivel is perfect for automatic untangling of two leashes. However by itself or even if used in multiples cannot automatically resolve all possible entanglements when using three or more leashes.

Walking Three Dogs

The state of the art of walking three dogs with a single handle however is generally not well known. The reason may be that these setups don't work that well or are elaborate and expensive and don't get many good reviews which restricts their sales and the public's knowledge. Many US and foreign patents however do claim that their leash arrangements for two dogs also avoid or resolve entanglements for three (or more) dogs. There are three-dog tripler leashes available commercially, having a swivel at the top with three short leashes. In another three-dog setup, a two-leash coupler is added and connected to a second two-leash coupler, with one dog on the higher and two dogs close together on the lower coupler.

Incomplete Solutions for Three or More Dogs

Examination of these patents and the commercially available handles with coupler and tripler leashes shows that the setups often can untangle some or many of the possible entanglement combinations automatically, however not all of them. Some setups are designed to also keep the leashes apart to avoid entanglements and this also helps, but sometimes at the cost of constraining the dogs on short leashes. It also does not prevent all possible entanglements. Another observation is that many of these setups seem complex or expensive.

When three-dog setups only work for some of the possible entanglement combinations, the handler will likely still encounter several entanglements during a walk. These will need to be untangled manually by uncoupling one or more dogs. That is very unsafe, time-consuming and frustrating. It also means the handler cannot fully trust the device or system and may become fearful of walking three dogs and therefore walk the dogs less often. A good system should resolve all possible entanglements, allow the dogs to roam free within the radius of their leash length and allow the handler to continue walking the dogs.

All entanglements with three dogs can be avoided when the length of the three-dog tripler leashes or other end leashes is kept very short, which is often done in the prior art. The dogs are kept side-by-side and constrained so much that they cannot walk over or under any of the other leashes. This is the opposite of 'free roaming' In the case of male dogs this does not allow enough room to urinate in the usual fashion and the dog may urinate against the neighboring dog. It is believed that most handlers prefer that their dogs enjoy their walk more by having lots of room to roam, sniff, play and do their business.

An explanation follows on why the three or more dog setups in the state of the art do not work fully for all possible entanglements. For example, looking at the setup in FIG. 7 of U.S. Pat. No. 6,237,539 to Sporn, two dogs are on short leashes and the third dog is on a longer leash. Using the numbers 14, 15, and 21 for the three dogs, any of the three dogs can get entangled with any one of the others. The possible entanglements then are: 14 with 15 (will untangle automatically due to the swivel); 21 with the twin team 14-15 (will untangle automatically due to the swivels); 21 with 15 (cannot untangle as the untangle operation is blocked by 14); and 21 with 14 (cannot untangle as the untangle operation is blocked by 15).

Of the possible entanglements, half get resolved automatically, the other half are blocked, unless the two short leashes 14 and 15 are so short that 14 cannot cross with 15, and 21 cannot cross with either 14 or 15. More elaborate setups such as in the Gish and Prendes patents show similar shortcomings. They do automatic untangling but do not avoid or untangle all possible entanglement combinations and/or keep the dogs restricted to a small roaming space.

None of the prior art and available triplers have full untangle capability for three or more dogs. They do not resolve all possible entanglements and/or fail to allow full motion for each individual leash, or they may get around these by constraining dogs to very short leashes and do not allow the dogs to roam free within a normal leash length radius. When an entanglement with a prior art system does happen and is not resolved, the handler is faced with undoing a tangled mess and cannot continue walking the dogs. These are big disadvantages.

DISCLOSURE

Apparatus and methods for walking and controlling multiple animals together using leashes are disclosed. In particular these disclosures relate to safely walking, guiding, controlling and untangling three dogs using three leashes. Each of the three leashes is safely connected to a special three dog handle/controller held and handled by a handler. The three dog handle, with extra coupler or tripler leashes, can be used for up to 9 dogs. Further apparatus and methods are disclosed for four dogs using four leashes. Each of the four leashes is safely connected to a special four dog handle/controller held and handled by a handler. The four dog handle is advantageously an expansion of the three dog handle and its method of use. The four dog handle, with extra coupler or tripler leashes, can be used for up to 12 dogs.

Three Dog Handle

The three dog handle has three leash attachment locations in a spaced-apart triangular pattern, and with its method of use, allows the handler to actively control and resolve entanglements of the leashes when they occur using only rotations of the handle while continuing walking with the dogs. Each of the three dogs roams freely within its leash length radius. Optional use of the user's own leashes avoids the need to buy new leashes and hardware and the relatively simple handle is inexpensive and easy to manufacture.

The three dog handle can be used with up to 6 dogs when used with 3 leashes each having a very short two dog coupler leash at its end (3×2), or up to 9 dogs when used with 3 leashes each having a very short three dog tripler leash at its end (3×3). This could especially be of benefit for dog walkers.

Four Dog Handle

This handle has three leash attachment locations in a spaced apart triangular pattern for three dogs (the same as in the three dog handle). The handle has an additional leash attachment for a fourth dog at the end of a movable lever or arm or joystick-like member that is connected to the handle. The lever or arm can be moved along the handle by the handler for untangling operations. The Four dog handle, with its method of use, allows the handler to actively control and resolve entanglements of the leashes when they occur with rotations of the handle for three dogs combined with motions of the lever for the fourth dog while continuing walking with the dogs. Each of the four dogs roams freely within its leash length radius. Optional use with only two or three dogs if desired (leaving one or more dogs at home) is possible. The four dog handle of the invention can be used with up to 8 dogs when used with 4 leashes each having a very short two dog coupler leash at its end (4×2), or up to 12 dogs when used with 4 leashes each having a very short three dog tripler leash at its end (4×3).

Stronger Handles

The three dog and four dog handles can be increased and changed in size, material, strength and shape for operation by one, two or more people, by machine or with aid of a machine, and/or from a vehicle, to walk, guide, control and untangle stronger and larger animals such as cattle, horses, elephants, plow animals, water buffalo, and the like. A strong handle can also be built up by adapting, assembling and connecting two, three or more handles stacked on top of each other, with or without spacers in between.

Leashes

The leashes can be lines, leads, strings, wires, ropes, cords, slings, straps, cables, chains, other flexibles, semi-flexibles, rigid parts, semi-rigid parts, or any combination thereof.

Untangling

100% untangle capability with three or more dogs is not possible with conventional handle and leash arrangements largely because they do not provide the following capabilities that are readily met by the disclosed apparatus and methods:

1. One on one 'entangle': Any ONE of the individual leashes can get entangled with any ONE of the other leashes individually, and possibly multiple times, yet each such one on one entanglement is resolvable. These one on ones are in addition to other entanglements of any one leash with sets of two or more of the other leashes.
2. One on one 'motion': Each individual leash is movable 360 degrees around any other individual leash and in both directions, clockwise or counterclockwise, either over or under and around that individual leash, without unresolvedly entangling others. In addition the moving leash passes and clears that other leash completely.

No conventional systems use the disclosed three dog handle/controller with well placed triangularly spaced leash attachment locations on the handle, or the disclosed four dog handle with a movable lever for the fourth leash. No conventional systems use the disclosed method of active control by the handler using the handle and/or lever to undo all entanglements as they occur while continuing walking the dogs. The applicant's handle allows free roaming of the dogs within the radius of their leash lengths. In addition, the prior art requires use of special leashes and hardware that the user needs to buy and which may be expensive or difficult to use. With the disclosed handle, the user can use, and only needs, the user's existing leashes.

SUMMARY OF THE INVENTION

Three Dog Handle and Method

The three dog handle is a controller/handle for walking and controlling three dogs with three leashes. The disclosed device may also be used with other animals and even with persons such as children, when out walking near traffic, for instance. It has three preferably fixed leash attachment locations spaced apart in a triangular or advantageously equilateral triangular pattern, near or at the periphery of the handle. The three leashes are connected to the handle at the leash attachment locations. The method of untangling and resolution of all entanglements is done manually by the handler by rotating the handle, and usually only by rotating the handle, while continuing walking the dogs.

Four Dog Handle and Method

The four dog handle is a controller/handle for walking and controlling four dogs with four leashes. It consists of a three dog handle configuration with three leashes for control of three of the dogs and an added movable lever with a leash for control of the fourth dog. The lever is connected to the handle and is movable along the handle by the handler for untangling operations. The method of untangling and resolution of all entanglements is done manually by the handler by rotating the handle and by moving the lever with the fourth leash along the handle, while continuing walking the dogs.

Explanation of the Handles and their Use

Three Dog Handle

Triangular Leash Attachment Pattern: "Triangular' and 'triangle' in this application sometimes refer to the leash attachment location pattern of the handle. A set of imaginary lines connecting the three leash attachment locations on the handle form a theoretical triangle, both in the three dog and four dog handle. A preferred triangle is an equilateral triangle. The terms do not necessarily refer to the general shape or periphery of the handle itself. Many other shapes are possible such as wheels, circles, trispokes, trirotors, leaves and 3D shapes, while still maintaining the triangular pattern for the three leash connection locations. The leash attachment locations are advantageously fixed locations. Leash attachment locations that are variable, such as slots, sliders, levers and the like are also usable, provided a triangular pattern adequate for untangling operations is maintained. Multiple and or selectable attachment provisions for each leash to be attached are optionally available. The leash attachments do not have to be at the corners of an equilateral triangle. They can be at the corners of other triangles. However the equilateral triangle provides the maximum space between any two leashes for the untangling rotations of the handle. The closer the three leash attachment location pattern is to an equilateral triangle, the easier it is to rotate and pass and clear any entangled leash successfully either over or under and around its entangled partner leash(es) and bring it to the untangled state. The three dog handle advantageously has a central opening large enough to allow the handler to put a hand or arm (with winter clothing) through it, thus optionally freeing one or both hands when needed.

Smooth Thin Handle

The handle can be held horizontally, vertically or in any position in-between when not being rotated or even when being rotated. The more comfortable 'neutral' position is usually more or less horizontal. For ease of discussion assume that the plane of the theoretical triangle of the handle is kept in a horizontal position by the handler when not being rotated.

Due to tangling actions any dog may take any position in the row of dogs at any time During a walk the dogs will switch positions often. Also due to the untangling rotations, the top or bottom side of the handle will alternate between being up or down as viewed from above by the handler. Because of the dogs darting around, and entangling and untangling, the leashes/leash ends may often become positioned against the handle or slide along the handle. The handler's hand also desirably slides often along the handle. The handle therefore is preferably relatively thin and with the top and bottom side relatively smooth. The top and bottom side are also preferably identical (including symmetry relative to the midplane) to facilitate manufacturing, the rotations which move top to bottom and vice versa, and the movement and sliding of the leashes and the hand of the handler along and over the handle.

The handle can be thick or have 3D features but when overdone this tends to hamper untangling and the sliding of the leashes or the handler's hand, and increases weight and cost. The handle's shape is preferably tri-symmetrical. This shape provides three graspable portions or grips with easy sliding transitions in between. This allows the handler to adjust hand position easily so the middle leash (apparent) always points to the (current) middle dog after an untangling operation.

Leash Attachments

Leash attachment provisions in or on the handle can come in many configurations such as holes, slots, protrusions, indents or other means as part of the handle. They can also be comprised of any conceivable type of eyelet connector affixed to the handle. They can also be hole and pin combinations in the handle. In other configurations the handle itself can have a nearly closed shape with a narrow gap or opening for access, and slots or provisions on the inside of the handle to attach and detach leashes to the handle. In other configurations the handle may be comprised of two lockable and openable halves or may have an openable and lockable clamshell configuration with a suitable hinge whereby the leashes can be locked in between the two halves.

The terms eye-end, eyelet or eye are used to refer to an eye-bolt, eye-screw or other connector between handle and leash having a circular or non-circular opening or eye. Each eye-end is located at or near a corner of the theoretical triangle and used to attach a leash to the handle through the opening in that eye-end. The preferred embodiment for leash attachments to the handle is holes in the handle itself instead of eye-ends. Both holes and eye-ends could be openable with opening and closure means or could have a specially configured fixed slot open to the outside of the handle to attach or detach leashes easily.

Leashes that have a closed hand loop without an openable quick-release clasp in it can be attached to the handle by pulling the hand loop through the leash attachment opening in the handle or eyelet and threading the lower end of the leash through the hand loop making a knot, then tightening the knot. Such leashes can also be knotted in a similar fashion around a handle that has no attachment holes or eyelets in-between the three grips. Such a handle may have indents or protrusions or similar means built in or affixed to the handle or may rely on friction or other means between each leash and handle to keep each leash substantially in place to preserve the triangular leash attachment pattern. One alternative for instance is a gymnastics-like/size ring having three slight indents where the three leashes may be knotted so they never slide around.

The eyelet openings or holes in the handle are configured to not allow leashes or connectors to slip out or fall off. For safety reasons these holes or eye-ends therefore are preferably fully closed to always hold and contain the leashes when in use. The opening or hole size is preferably large or wide enough for leashes and leash loop clasps to be pulled through, for connecting the leashes to the handle without using connectors. Eye-ends or similar connectors are bolted, screwed into or mounted on the handle securely so they cannot come loose inadvertently and are preferably also easy to inspect. Clamp-type connectors are not recommended as they tend to fail more easily.

Special Three-Dog Leash Assemblies

One embodiment of the disclosed handle is a leash assembly comprised of a separate three-dog handle and three separate leashes attached to that handle. However there are other three-dog leash assemblies possible in which special leashes are used that have features that function as a handle:

1) Leash Assembly Having One Specialized Leash

In such an assembly there are two regular leashes such as are available commercially and one specially adapted leash, called 'main' leash. This main leash has a special hand loop at its upper end integrated with or connected to the leash and is substantially open and formed and functions as the handle. This handle portion (or more) can be rigid, semi-rigid or flexible. Additionally this hand loop or special leash end has two spaced-apart leash attachment locations for the two regular leashes, the three leashes together forming the triangular attachment pattern disclosed herein. In such an assembly the separate handle is basically replaced by a handle that is part of this specialized main leash.

2) Leash Assembly Having a Specialized Set of Two Leashes

Such an assembly is similar to the above but instead has a special hand loop wherein two leashes or upper portions thereof are integrated with or attached to it in a spaced-apart fashion. This special hand loop is substantially open and formed and functions as a handle. This handle portion (or more) can be rigid, semi-rigid or flexible. This two leash set has a spaced-apart leash attachment provision for the third leash, the three leashes together forming the necessary triangular pattern.

3) Leash Assembly Having a Specialized Set of Three Leashes

Such an assembly is similar to the above but in this case all three leashes are integrated with or attached to a common central and substantially open hand loop in a spaced-apart fashion whereby the three leashes form the triangular pattern with their attachments to the handle.

There are other leash assembly configurations possible whereby the user can use all three of his or her regular leashes. Instead of having a main leash with an upper hand loop substantially configured as a handle as described above, a specially designed handle insert, for instance in the form of a triangle or spool with a U-shaped or near-circular profile, can be inserted in the hand loop of one of the three leashes keeping that hand loop substantially open. This insert is rigid or semi-rigid and also has two spaced-apart leash attachment provisions for the other two regular leashes, the three leashes together forming the triangular pattern. This insert can also be comprised of three separate preferably curved pieces, each piece positioned between two leash ends.

Untangling Operation

The handle's spaced apart triangular leash attachment locations make it possible to untangle any entanglement of two or more leashes including multiple entanglements of any or all leashes that may arise during walking. This untangling is done by an approximate 180 degree rotation action (half rotation, half flip, half turn) of the handle per entanglement by the handler. An additional advantage is that untangling can be done while continuing walking the dogs. The disclaimer here is that 'any' entanglement means the forward entanglements of the dogs and leashes among themselves. It does not include dogs encircling an external object, a person or other leashed dog, or splitting up around an external object such as a tree, or backtracking and encircling the handler from behind, or the leashes ensnaring a loose branch, stick or other object, etc. No walking system or device can resolve those.

Single Entanglement

A single untangling operation of one entanglement works as follows: Let us assume the three dogs with their leashes and corners of the handle's triangle are labeled L(eft), M(iddle) and R(ight) and that the left dog L crosses under the leash of the middle dog M from the left to the middle of the pack looking forward. With the handle in a horizontal position in front of the handler, leash L is then entangled with and crossed under leash M. The order of the leashes at the handle is still LMR, the order of the dogs on the team is now MLR.

The untangling rotation for this one entanglement would start with holding the handle with the right hand at or near triangle corner R. Each perpendicular or normal from a triangle vertex through its center onto the opposite side is called an axis of rotation of the handle as the rotations are roughly around these normals. The handle is then rotated with the right hand around its rotation axis through R so that corner L with leash L rotates 180 degrees (half a turn) around and under leash M which is counterclockwise as viewed from the handler. Leash end L moves in-between leash M and R with leash L clearing and passing leash M. The left hand is usually used to help with the rotation so that the handle is not dropped. This half rotation amounts to L and M clearing each other and switching place which brings the order of the leashes at the handle in synch with the order of the dogs up front. The handle then aligns itself slightly in the horizontal plane by the pulling forces of the dogs or by the handler's hand moving to a comfortable position. The same untangling operation would be needed if instead dog M crossed over the leash of dog L to the left of the pack looking forward. The entanglement is the same and the untangling action is also the same but can be described as being a rotation of leash M 180 degrees over and around the same rotation axis of the handle through R. Either rotation can be used to resolve either entanglement.

The rotation of the handle does not need to be exactly around a rotation axes of the handle as defined above. Any line with an angle of 30 degrees or even more from the normal (through R in this case) in the plane of the theoretical triangle can be used as long as the entangled leash passes and clears the other leash and ends up in a position in between the other two leashes. This means that even the sides of the theoretical triangle are very usable. The term 'rotation axis' generally refers to the perpendicular but includes any other possible line of rotation through the same leash attachment location.

Method of Active Control and Untangling

The untangling method with the applicant's handle is using 'active' control by the handler (requiring action/manipulation by the handler) versus the mostly 'passive' control of the prior art devices and commercial triplers. Passive control relies on swivels or a mechanical system of swivels, other hardware and special leash arrangements to avoid entanglements and/or to do untangling automatically. The prior art mostly does not use manipulation of the handle itself and/or does not make use of the handler's hands except for holding and pulling the handle. With the handle, active control of untangling is in the hands of the handler. The solution is to accept that with three or more dogs entanglements will always occur and to assign the resolution to the handler while allowing the handler to continue walking the dogs.

Order of Untangling

As mentioned earlier, any entanglement, even multiple entanglements between two or all leashes, even multiple times, can be resolved by the handler by rotating the three dog handle approximately 180 degrees for each entanglement. This untangling is generally done in the order the entanglements occurred in and while continuing walking the dogs. Sometimes when three leashes are all entangled in sequence and in the same direction, a single 180 degree counterrotation of the handle will correct these, which speeds up the untangling considerably. This counterrotation is usually done around the forward rotation axis through the middle attachment location, as the handler usually holds the handle at the side which is closest to the handler. This resolution of three entanglements with only one (half) rotation is an exception.

The order for untangling is easy to observe and follow from the overlapping leashes or leash ends close to the handle. The entanglement due to the pull of the dogs tends to travel in the direction of the handle but allows enough space or slack close to the handle to rotate the handle between and around leashes as needed to untangle. While looking at the handle and the overlapping leashes and leash ends from above, the handler can easily untangle by rotating the first entangled leash end in-between and either over or under and around the other entangled leash and so forth. Each half rotation of the handle is either clockwise forward over and around a leash or counterclockwise backward under and around a leash from/by the handler. With continued half rotations roughly around the axes of rotation of the triangle while viewing the remaining overlaps, all entanglements are resolved.

Rotatable Components

If only two of the three leashes are entangled and several times in the same direction, which occurs often, then the rotation of the handle will be several times either clockwise or counterclockwise in the same direction and around the rotation axis of the triangle normal to the triangle's side that has the two entangled leashes. Multiple rotations of this simple kind can be made a little faster by making the three tips (with vertices) or arms of the handle themselves rotatable relative to the handle and directly in line with the triangle's rotation axes. The handler can just hold a rotatable arm or tip steady and rotate the handle with the two other leash attachments around it. This is a little faster than flipping the whole handle over 180 degrees several times. The end result is the same. However this would require adding three rotatable tips, arms or grips to the handle, or separate swivel connectors as another option.

Making these components part of the handle is preferable over using separate swivel connectors. Swivels such as swivel snap hooks can be pulled in any direction and would not necessarily align with the rotation axes of the triangle, which could hamper instead of aid the untangling. It is not necessary to use these rotational add-ons but it would make correcting this particular case of entanglement when it occurs a little faster. Swivel snap hooks can be trusted at the dog's collar due to the pulling force but not at the handle. At the handle a swivel snap hook can be pushed or pulled open unexpectedly. The entangled leashes may wrap or move over the handle and into and over a snap hook in any direction and open it, which could lead to a sudden and dangerous escape of a dog. If the handler does want to use connectors, sturdy lockable quick links or carabiners (with or without swivel) or anchor shackles are preferred. These are safer and can be inspected before and during a walk. The preferred embodiments of the three dog handle are kept simple, robust and inexpensive, and do not use rotatable components and/or connectors.

Overlaps

To see the overlaps better and to aid the untangling, it may help to use different colors or patterns for the leashes, wider and/or thicker leashes and/or special flexible, semiflexible or colored coverings over or on the leashes or upper part of the leashes close to the handle, but this is not considered necessary. The thin black wires commonly used in retractable leashes are somewhat harder to observe. It is generally recommended to use retractables that have a leash width other than wire. Use of stretchable leashes is very acceptable. The more practice, no matter the type of leash, the faster and smoother the untangling goes.

Speed of Untangling

Tests with three dog handles have shown that one untanglement takes on average roughly a second for one 180 degree rotation (half turn). To do 10 untanglements in a row may take 10-15 seconds for a handler with experience in using the handle. This also depends somewhat on the tightness of the entanglements. In addition the handler can keep on walking while untangling. Untangling of separate leashes or when prior art devices fail can take many minutes and requires a stop. It may sometimes be impossible without the help of a second person. With the handle, the dogs also tend to get used to untangling operations. They soon seem to be expecting an untangle operation whenever their roaming distance gets shortened by entanglements. They may then back off a little and stop walking or pulling until they feel the leash getting untangled and relaxed. In addition, the more trained the dogs become, the more they tend to walk and stay in line, reducing the number of entanglements. The handle is therefore particularly useful for untrained dogs or very active dogs or for handlers whose intention is not a fast walk but mainly a recreational out for the dogs allowing each dog to sniff, stop, dart, or play as much as it wants within the radius of its leash length.

Untangle Often

The preferred strategy with the three dog handle is to untangle when one or few entanglements occur. With active dogs that dart around a lot, the handler may continuously perform untangle operations. It is acceptable to let the entanglements build up and then, for example, take a short break and do all the untangling. However to let the dogs roam free most of the time and to keep walking and for ease of untangling, the best mode is to untangle when one or few entanglements occur. One may think that a handler will not like manipulating the handle this way so often. However with the applicant's handle, the handler will always be able to resolve all entanglements. And freeing your dogs, and so easily, is always rewarding. It avoids the terrible frustration of handler and dogs when trying to untangle a tangled web of separate leashes or leashes of an antitangle system. In addition the handler knowing that he/she will always be able to untangle, will let go of the fear of walking three dogs together. This will encourage an individual to take three dogs for a walk more often. Walks are often skipped out of fear of entanglements or out of fear of a dog escaping or when a second person is not available. More walks provide a health benefit for walkers and dogs.

Four Dog Handle

An expansion into a four dog handle that works is to have a movable fourth leash. This is preferably done by adding a movable lever or shifter with a leash attachment location for the fourth dog on it, that is connected to the handle but movable around the handle by the handler. Whenever an entanglement of the three leashes occurs, the four dog handle is rotated to untangle and the position of the lever with the fourth leash is changed by the handler accordingly. In addition, when the fourth leash gets entangled with any of the three, the fourth leash needs to be moved around it to untangle it. The movable lever preferably has a slider at one end which is connected to the handle and can slide along the handle. It slides preferably in or along grooves or channels or tracks located in or on a preferably spherical or cylindrical or similar shape in the center of the handle. The fourth leash is attached to the other (free) end of the lever. The leash attachment at this free end preferably extends beyond any of the three fixed leash attachment locations when measured in the plane of the triangle. This makes it easier to clear and pass the fourth leash around any of the three other leash attachments and their leashes in untangling operations.

Untangling

The available motion path of the lever with the fourth leash is a full 360 degrees along the central ball either clockwise or counterclockwise in a groove or track in-between and around any one of the other three leash attachment locations. The preferred configuration is three hollow circular grooves just inside the central sphere. The preferred grooves are three half circles going from top to bottom along the sphere and lying on great circles 120 degrees apart. The grooves have a common junction at the top and bottom side of the ball and handle. The lever can easily transition from any of the three grooves into another at each common junction and be moved 180 degrees from the upper to the lower side or vice versa in any of the grooves as needed. This provides a 180 and 360 degree motion capability in both directions and around any of the three fixed leash attachments, with easy transitioning between them. It makes it possible to always untangle the fourth leash from any one or more of the three fixed leashes and vice versa.

When the fourth leash gets entangled with one of the three fixed leashes, the lever with leash will be moved around the entangled leash in the selected groove either 180 degrees to bring it to the other side of the handle or 360 degrees to move it completely around it. If only the fixed leashes on the handle are entangled among themselves, an untangling rotation of the handle can be accomplished if the lever of the fourth leash is moved with it in a selected groove usually 180 degrees to the upper or lower side of the handle as needed depending on where it was. The preferred use is to give priority to untangling the fourth leash, then to untangle the others as needed. However this may change based on the sequence of entanglements as viewed from the overlaps. Moving the lever for the fourth dog increases the workload of the handler and usually needs to be done quickly to avoid the lever's motion getting blocked by several entanglements. A four dog handle requires untangling when one or few entanglements occur and requires more practice than a three dog handle.

Open Configuration

Alternative embodiments of the three dog handle are very simple and all have a large central opening for the hand of the handler. These closed shape configurations could be used for a four dog handle but other, open shape configurations such as trispoke, triblade or trileaf work much better. The open shape makes it possible to have a ball or cylinder or similar shape located in the center of the handle for the lever to move over. A sphere or ball in the center is preferred as the motion paths of the lever will be shortest and smoothest. The open shape is needed otherwise the closed periphery will block the fourth leash from being able to be moved from top to bottom and vice versa and around any of the three fixed leash attachment locations to untangle. A wheel type handle could be used but would require much longer motion paths along the spokes and/or the periphery of the wheel.

Tether

If the handler wants to use the four dog handle with only three dogs, he/she should use the three fixed leashes as that is easiest, and leave the lever alone or preferably park it against one of the three spokes or arms. Another option, although it increases the workload, is to tether the lever with a short flexible strap or leash to his/her waist, which makes holding the handle extra safe. As mentioned before, a three dog handle is advantageously not tethered to the handler.

Particular Embodiments

In one embodiment, a leash assembly for simultaneously walking multiple animals and untangling leashes while allowing each of the animals to pursue activity within the range of its leash length is disclosed. Three leashes are included, each leash having an upper end with hand loop, optionally an upper end without hand loop, and an opposing lower end with locking member for attaching to one animal or a plurality of animals. There is a handle with at least one graspable portion for controlling the animals by a handler and a leash bundling means for keeping the upper ends of the leashes together so as not to drop any of the leashes. The handle and leash bundling means is combined in one handle, and the handle further includes three leash attachment provisions. The upper end of each one of the leashes is attached to the handle directly in one each of the leash attachment provisions. Optionally the leash assembly also has connector means for connecting the leashes to the handle. An upper end of each one of the leashes is connected with at least one of the connector means to one each of the leash attachment provisions. The leash attachment provisions are positioned spaced-apart, thereby enabling untangling of leash entanglements by rotations of the handle by the handler. Handling of the animals, bundling of the leashes and untangling of the leashes is accomplished with a single hand-held part or unit, and untangling is accomplished by the handler while continuing walking the animals.

In some embodiments the leash attachment provisions are positioned spaced-apart in a triangular pattern, preferably an equilateral triangular pattern, thereby facilitating untangling of leash entanglements by rotations of the handle by the handler. The leash attachment provisions are preferably elongated or circular openings in the handle, optionally protrusions on the handle, optionally pin and hole combinations in the handle, optionally clamping means in or on the handle, optionally eyelet means affixed to the handle, optionally other holding means affixed to the handle, optionally any combination thereof.

Any one of the leash attachment provisions may have an outward open gap feature of sufficient size, optionally the handle may further have opening and closure means integral with or connected to the leash attachment provisions, through which any one of the leashes can be attached to or detached from the handle.

The handle often includes an outer perimeter and an inner perimeter including an enclosed or substantially enclosed inner opening. The inner opening is of sufficient size to accommodate moving a hand with at least a proximal portion of the arm with clothing around the arm through the inner opening to hold or carry the handle with the arm, thereby freeing one or both hands.

At least portions of the inner and outer perimeter of the handle are substantially offset from each other with sufficient width so as to provide a graspable portion between at least any two of the leash attachment provisions, thereby providing at least three graspable portions on the handle.

In another embodiment the handle has three spokes or leaves each leaf having an enclosed inner opening or a substantially enclosed inner opening for handling and a central member integral with or connected to the spokes or leaves so the central member is substantially positioned at the approximate center of the triangular pattern. The central member may have one or more graspable portions and each one of the spokes or leaves includes one of the leash attachment provisions substantially positioned near or at the radially outward end of the spoke or leaf. The line between the approximate center of the triangular pattern and the one leash attachment provision is its longitudinal axis and each of the spokes or leaves is of sufficient size to provide at least one graspable portion, thereby providing at least three graspable portions on the handle.

The handle also advantageously has grip means of sufficient length connected to the handle surrounding any one of the graspable portions, so that the grip means is freely rotatable clockwise or counter-clockwise 360 degrees around the one graspable portion, thereby facilitating handling and untangling. Any one of the spokes or leaves is connected to the central member freely rotatable within predetermined angles clockwise or counter-clockwise around an axis substantially perpendicular to the triangular pattern and the axis is positioned substantially at the inward end of the spoke or leaf. Optionally the axis is positioned near or at the center or approximate center of the triangular pattern, thereby facilitating handling and untangling.

A handle may optionally have a spool or reel with an inner opening of sufficient size to accommodate use by a hand, and an outward-open groove or channel around the inner opening and a ring member fully surrounding the inner opening so the leash attachment provisions are included in the ring member. The ring member is slidably contained in the groove or channel and freely rotatable fully or within predetermined angles clockwise or counter-clockwise around the spool or reel.

A handle may optionally have means for holding, handling and untangling a fourth leash, the fourth leash having an upper end with a hand loop, and optionally an upper end without hand loop, and an opposing lower end. The upper end of the fourth leash is attached to the handle and the lower end with locking member is attached to one animal or a plurality of animals. The holding means for the fourth leash has a joystick-like member, having an inner end, an opposing outer end, connecting means holding the inner and outer end together at a sufficient distance to allow use of the member by a hand, and graspable means integral with or connected to the member for manipulation of the member. It also has a leash attachment provision for attaching the upper end of the fourth leash to the outer end of the joystick-like member and second holding means for holding the inner end of the joystick-like member movably connected to the handle. The joystick-like member is freely movable by hand by the handler clockwise or counter-clockwise 360 degrees around any one of the leash attachment provisions of the handle for untangling operations of the fourth leash. The second holding means has slider means integral with or connected to the inner end of the joystick-like member and a plurality of grooves or channels integral with or connected to the handle, the handle having a top side as viewed by the handler and an opposing bottom side. At least one of the grooves or channels extends from the top side to the bottom side in-between each two of the leash attachment provisions of the handle and the grooves or channels are interconnected at the top and the bottom side. The slider means is slidably connected with the handle in any one of the plurality of grooves or channels and can freely slide along and transition into any one of the grooves or channels.

Advantageously the handle has a substantially spherical, cylindrical or other voluminous shape integral with or connected to the handle substantially positioned at or near the center or approximate center of the triangular pattern, and the grooves or channels are located in or on the central shape, thereby providing short motion paths for the joystick-like member for untangling operations of the fourth leash. The central shape desirably has three or six separate identical segments, each having matching half grooves or channels, and the segments are assembled together with the handle so the joystick-like member is freely movable in matched-up full grooves or channels.

A method for simultaneously walking multiple animals and untangling leashes while allowing each of the animals to pursue activity within the range of its leash length is also disclosed. The method steps are attaching the upper end of each one of three separate leashes to a handle, attaching the opposing lower end of each one of the leashes to one animal or a plurality of animals, untangling leash entanglements by a handler only using the handle.

Variant methods include the step of untangling the leash entanglements by the handler only by rotations of the handle or untangling the leash entanglements by the handler one by one by rotations of the handle, approximately one half rotation for each entanglement between any two of the three leashes, or by observing leash entanglements by viewing leash overlaps and untangling the leash entanglements by the handler starting with the uppermost of the leash overlaps as viewed by the handler or untangling successive leash entanglements by the handler one by one as viewed by the handler in the reverse sequence in which the leash overlaps occurred.

An alternate method includes the steps of attaching the upper end of each one of three separate leashes to a handle, attaching the opposing lower end of each one of the leashes to one animal or a plurality of animals, attaching the upper end of a separate fourth leash to a movable member connected to the handle, attaching the opposing lower end of the fourth leash to one animal or a plurality of animals, and untangling leash entanglements by a handler only using the movable member and the handle. Variant steps include untangling leash entanglements of the fourth leash by the handler by moving the movable member along the handle, untangling leash entanglements of the three leashes by the handler by rotations of the handle, untangling the leash entanglements of the fourth leash by the handler one by one by moving the movable member along the handle and passing the upper end of the fourth leash around the leash attachment location of any one of the three leashes entangled with the fourth leash, and untangling leash entanglements of the three leashes by the handler one by one by rotations of the handle, approximately one half rotation for each entanglement between any two of the three leashes.

A basic embodiment of the disclosed apparatus is a handle for walking dogs on three leashes and for untangling crossed leashes while walking. The handle has three leashes, each leash having a dog attachment end and a dog attachment means on that end, and a handle attachment end and a handle attachment means on the handle attachment end. The handle has three leash attachment locations, each location having means to attach one of the leashes to the handle, the three locations roughly corresponding to the vertices of a triangle.

Use of the word "roughly" in this disclosure is intended to convey a sense of working approximation, where "working" means to effect the purposes otherwise disclosed herein. Thus the terms of this disclosure that otherwise make use of or call out various mathematical constructs or shapes are not intended to be limited to mathematical exactitude. If three lines or pieces of material sort of meet at their ends, then we have "roughly" a triangle. Also with respect to various polygonal shapes mentioned, the connecting lines or sides of the shapes do not have to be straight or even a mathematical curve, notwithstanding that sometimes such exact shapes are also referred to in this disclosure. Similarly use of the term "lines" can mean leash lines or the like in some places, and can also mean real or imaginary lines connecting two or more points.

Reference herein to three leashes or four leashes, respectively desirable for various embodiments disclosed herein, is intended to encompass the use of fewer leashes, especially if the use of fewer leashes is effected to avoid the scope of the claims. Nonetheless, it is believed that disclosed three and four leash embodiments can not be inferred from conventional single and double leash devices, or even from so called "tripler" leash arrangement which merely splice or add one or more leashes to a conventional two leash arrangement.

The disclosed handle optionally has three graspable handle grips, and each handle grip can be roughly rod or bar shaped. At least one of the handle grips is interposed between two of the three leash attachment locations. The handle is a material having at least one central opening and the central opening optionally can extend at least partially to an edge of the material so that the handle is not a closed shape.

Where the handle has graspable handle grips, at least for some embodiments, each of the handle grips is interposed between a selected two of the three leash attachment locations. A good handle is roughly that of a circle, or triangle, or trispoke or trefoil. Where the handle is roughly that of a triangle, each of the vertices of the triangle are advantageously roughly congruent with one of the three leash attachment locations, as is more readily apparent from the drawing figures. Where the handle shape is triangular, a roughly equilateral triangular shape is desirable, and each of the three leash attachment locations is at or near a vertex of the triangle. Regardless of the shape of the handle, or the positioning of the leash attachment locations on the handle, three lines imaginarily produced (whether visible or not) to connect the three leash attachment locations will form the sides of a triangle. This will be true even when that imaginary triangle is not equilateral.

An alternate handle for walking four dogs has a handle body (which in most respects can be the kind of handle system described above, but does not have to be) and a joystick-like member. The joystick member has an inner end and an outer end. The handle body has a plurality of leash attachment locations and the joystick-like member is movably connected to the handle body and has a leash attachment location at or near its outer end. The inner end of the joystick has a slider and the handle body has a plurality of channels. Looking at the handle as having a top side and a bottom side, at least one of the channels extends from the top side to the bottom side in between two of the handle body leash attachment locations and the channels are interconnected at top and bottom sides so the slider is slidably connected in the handle body in any one of the plurality of channels and is freely slidable along any of the channels.

Another method of untangling leash entanglements in a three dog lead includes the step of leashing the three dogs (for example we may think of the dogs as L-M-R arrayed from left to right) to a handle device provided with three spaced-apart leash attachment locations (for purposes of this explanation, also called L, M and R respectively), so that three imaginary lines produced between the three leash attachment locations form the sides of a triangle that has vertices L, M, and R. So, when looking in the direction the dogs are walking, the leash attachment locations are also arrayed in working fashion as L, M, R from left to right. See example in FIG. 6A. Observing a leash entanglement is desirably accomplished by viewing as if from above an overlap of the leashes to dogs L and M where for instance dog M has crossed behind dog L (or alternatively dog L has crossed in front of or jumped over dog M) such that the dogs are now left-right arrayed as M-L-R (see example in FIG. 6B). Turning the handle device in such a way that location L of the device is moved into a position medial to locations M and R (see FIG. 6C) results in a new working array of leash attachment locations M, L, R and with no leashes left tangled. See example in FIG. 6D.

In this disclosed method dogs and leash attachment locations can have other letter designations, or no designation at all, and the dogs can and do trace other entangling patterns with each other, including multiple entanglements. In each untangling operation, the leashes are untangled one turn of the handle at a time, in like manner to that just described above, each turn thus moving the respective attachment location corresponding to the most recent leash crossing to a position medial to the other two locations, to thus resolve the tangle. See further examples in FIGS. 7A-D.

Summary of Advantages and Benefits Disclosed

For Handler/User/Owner
Full control over entanglements and untangling
Can untangle while continuing to walk
Can untangle when it happens, which maintains the roaming space for the dogs
Can untangle, no matter how many entanglements
No frustration due to unresolved entanglements; no or few stops
Easy to observe entanglements via overlapping leashes for untangling order
No danger of dropping a leash and a dog escaping when untangling
Feels very safe as dogs cannot come loose or escape; will walk more often
No danger of openable connectors failing or leashes sliding out of snap hooks
Active control at all times, giving handler something to do, relieving boredom
Single hold instead of separate leashes; handle can also be held with two hands
Keeps dogs safely together so all dogs can be pulled away from danger together
Easy method of use, easy to learn, handler and untangler are one and the same
Is inexpensive, few or no extra or moving parts, easy to inspect, does not wear fast
Small part, easy to take along or transport; versus complex antitangle systems
Leash lengths do not have to be equal; does not need to buy new leashes
Dogs can be different size, height and strength
Can walk two or three dogs with the three dog handle, and two, three or four with the four dog handle; untangling is simple when walking only two
Can easily attach or remove a leash
Can use existing leashes; no need to buy new leashes and hardware
Can park the three dog handle at a post, rail or gate, or use a bicycle lock, utilizing the central opening, if/when needed
Can free both hands with a three dog handle by putting a hand or arm through the central opening to hold the handle
Can hang the three dog handle up at home using the central opening
Forces of dogs pulling in different directions act on the handle, keeping the handler's holding force lower
Connectors if used can be under the surface to avoid hurting the handler's hands
A dog that stays behind will be pulled forward by the others so the handler will need to pull a dog forward less often
When handle is dropped, dogs will move slowly as they will pull in different directions so handler can catch up easily
When a dog backtracks and fully encircles the handler from behind, the handle can be lowered which moves all leashes lower, allowing the handler to step out
Handle is easy to hold, may have comfortable and soft grips
Handle is tri-symmetrical with three grips and comfortable transitions in between, allowing the handler to select the best grip depending on the changing positions of the dogs.
Handler's hand can easily slide along the handle without pain or injury to the hand
Handle can safely be moved higher, which is often done, without dropping a leash
Can be used for up to 6 dogs with the three dog handle and up to 8 dogs with the four dog handle by adding a short coupler leash to the end of each leash
Can be used for up to 9 dogs with the three dog handle and up to 12 dogs with the four dog handle by adding a short tripler leash to the end of each leash
For Manufacturer/Licensee/Seller
One part or few parts, easy to manufacture, minimizes inspection, defects, returns
One or more materials if desired, one color if desired, simple shape, few holes
Any material such as wood, MDF, metal, plastics, braids, rubber, etc.
No or little assembly required
Easy to stack, package and ship due to close to flat shape and small size
Packaging can be designed to allow buyer in store to hold and feel the handle
Many shapes, sizes, materials, colors, paint schemes, finishes possible, allowing newer product issues frequently, also providing good pricing flexibility and differentiation
Easy to show and demonstrate, with or without dogs (simulating entanglements)
Close to flat shape easy to paint, decorate, stick labels to, engrave, add graphics
Part(s) can be machined, cast, forged, pressed, injection molded, welded, etc.
Part(s) can be scaled up or down, or designed and made for holding by two hands
The preferred three dog handle can be made as a single part, two identical halves (split in midplane) or three identical segments as they are trisymmetrical (dihedral 3), simplifying the tooling requirement in each case to one tool For Dogs Free roaming within leash length radius, allowing to enjoy the walk more Free roaming ample space for sniffing, play, urinating, or other activity Free roaming dog that falls behind to urinate gets seconds before the other dogs start pulling him/her forward, so an attentive handler gets time to react and hold the forward dogs No stops for untangling No fear of entanglement or untangling No pain or frustration due to unresolved tighter and tighter entanglements More walks as handlers will not avoid walking three or four dogs (with one person)

BRIEF DESCRIPTION OF THE DRAWINGS

FIGS. 6A, 6B, 6C, 6D show plan views of a single entanglement and resolution.

BEST MODE

Figure 1:
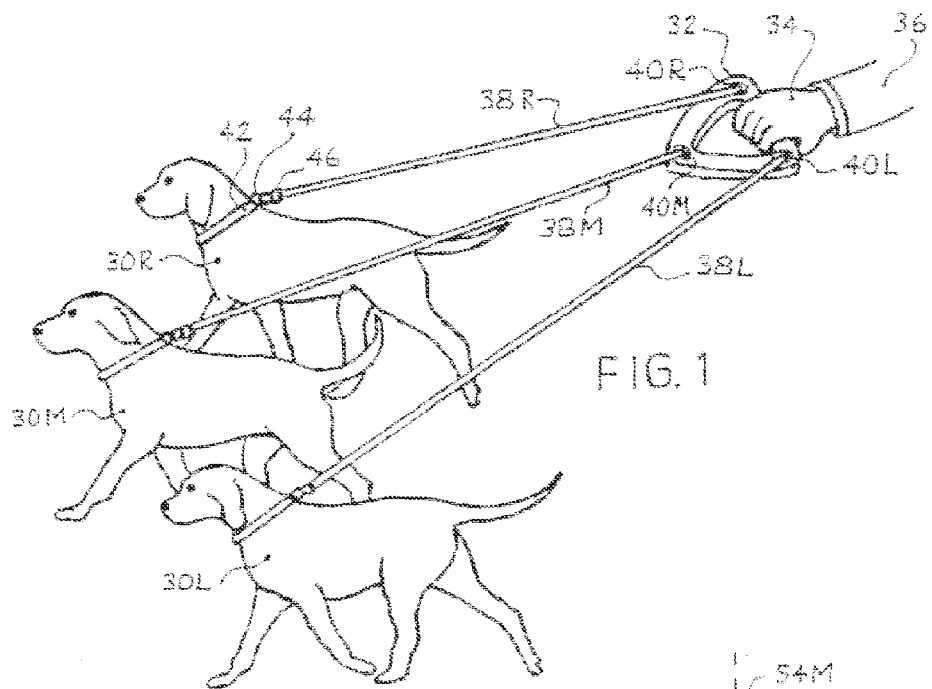
FIG. 1 is a perspective view showing typical use of the three dog handle.

In the drawings like reference numerals or characters designate like or similar parts.

FIG. 1 is a perspective view showing typical use of the three dog handle with three dogs and three leashes. Looking forward from the handler, it shows the left dog 30L, middle dog 30M and right dog 30R. The three dog handle 32 is held by the handler's hand 34 and arm 36. The three leashes 38L, 38M, 38R are connected to handle 32 at leash attachment locations 40L, 40M, 40R respectively, which locations form a triangular pattern and preferably an equilateral triangular pattern. At the lower end each leash is connected to a dog's collar 42 (or harness) having a ring 44, via a swivel snap hook 46 at the low end of each leash.

Figure 2:
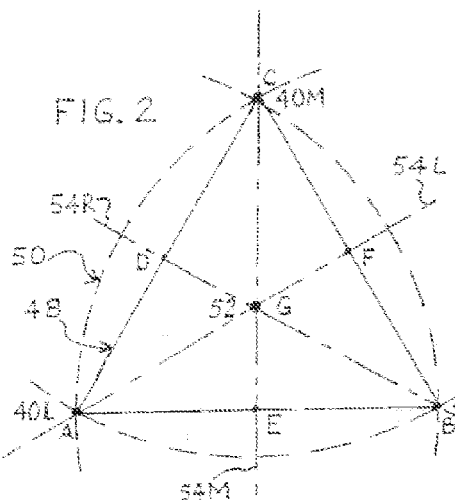
FIG. 2 is a plan view of an equilateral triangle with a Reuleaux triangle.

FIG. 2 is a plan view of an equilateral triangle shown in solid lines and an equilateral Reuleaux triangle in dash lines. Leash attachment locations 40L, 40R and 40M are the vertices of the equilateral triangle 48 with sides AB, BC, AC and the Reuleaux triangle 50. The center of both triangles is 52 (G). Reuleaux triangle 50 per definition is constructed using AB=BC=AC as radius with A, B and C respectively as center. The Reuleaux triangle is an often used shape in-between the solid line triangle 48 and a full circle with AG=BG=CG as radius and 52 as center. The perpendicular or normal lines 54L (AF), 54M (CE) and 54R (BD) through the triangle's center are the handle's rotation axes in the untangling operations.

Figure 3:
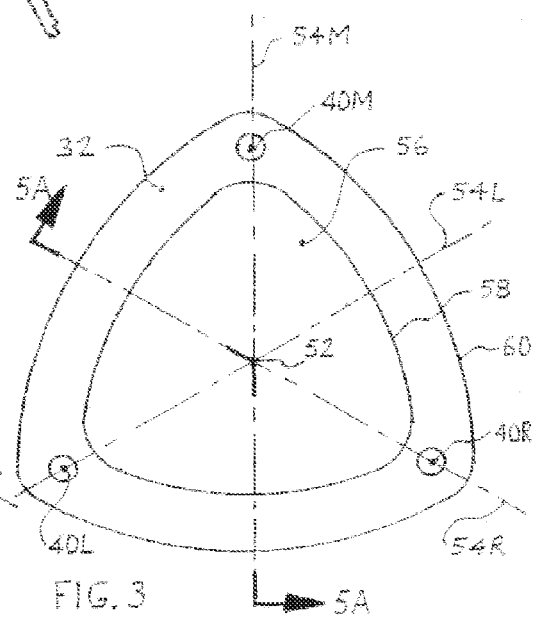
FIG. 3 is a plan view of an embodiment of a single part three dog handle.

FIG. 3 is a plan view of the preferred and best mode embodiment of a single part three dog handle 32. It uses a Reuleaux triangle for the inner periphery 58 and outer periphery 60 offset from the dash line Reuleaux equilateral triangle 50 shown in FIG. 2. With rounded inner and outer corners, enough crosssectional width and using the preferred Reuleaux triangular shape, the handle's central hole or opening 56 is large and smooth enough for the handler's hand. The handler can comfortably hold the handle at any of the three sides or grips as well as easily slide his/her hand along the handle to change positions as needed due to untangling operations and the pulling forces of the dogs. For example, the handler can keep the forward end of the handle pointing to the middle dog after an untangling operation. The three sides of the handle can have soft coverings or other comfortable grips or a continuous grip. Central hole 56 is also preferably large enough to allow the handler to put a hand or arm through it in case the handler wants to free one or two hands while still keeping control of the handle. This is especially useful when picking up and removing dog waste from the team of dogs. Having the inner size requirements, the crosssectional width and outer periphery 60 are determined by strength and handling requirements, and to accommodate leash attachment holes at vertices 40L, 40M, 40R. In general the smaller the handle the easier it is to move a leash between and past other leashes in an untangle rotation. A bigger handle may sometimes be easier to hold. In the preferred embodiment the size of handle 32 is kept as small as possible as ease of untangling is of prime importance while still providing a comfortable grip for the handler's hand at each of the three sides. As the width of a hand is roughly 3.0 to 4.5 inches, the distance between two leash attachment locations for one hand on the handle is roughly 5.0 to 6.5 inches. The three attachment holes can be round or elongated to allow leashes or leash loop clasps to be pulled through and connected to the handle without using connectors. The handle can be scaled up for handlers that prefer a bigger handle, such as one that can be held with two hands at each side.

Figures 4A, 4B:
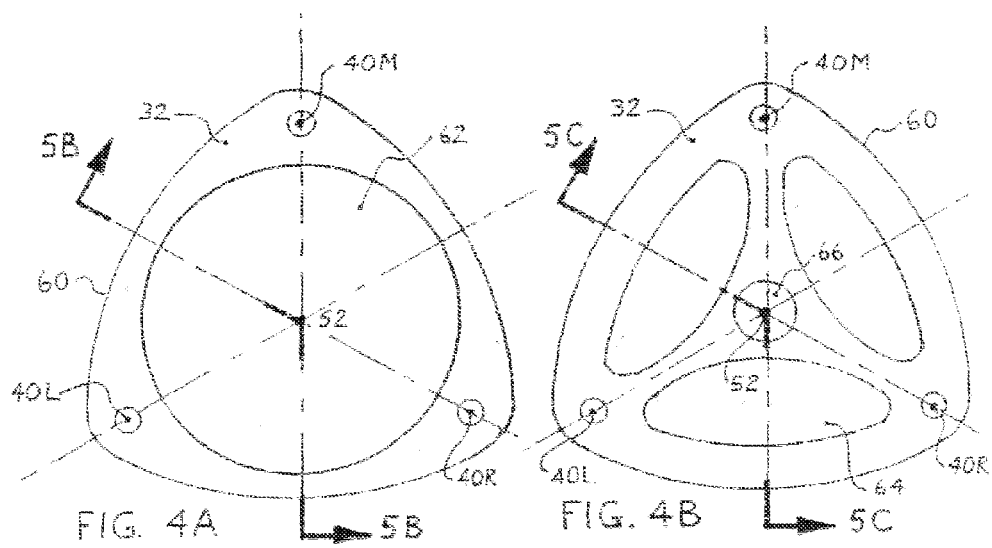
FIG. 4A is a plan view of another embodiment of a single part handle.
FIG. 4B is a plan view of another embodiment of a single part handle.

FIG. 4A is a plan view of a second preferred embodiment of a single part three dog handle 32. This embodiment has the same outer periphery 60 and size as FIG. 3 handle. However the central hole 62 is a complete circle with center 52 instead of a Reuleaux triangle with center 52. The FIG. 3 shape is preferred for its less curved shape and the fuller crosssection which is generally more comfortable when held for long times or with larger forces from the dogs.

FIG. 4B is a plan view of a third preferred embodiment of a single part three dog handle. Handle 32 has a wheel type configuration, with leash attachments 40L, 40M, 40R in the equilateral triangular pattern, center 52, large enough holes 64 along each of the sides to hold the handle, and same outer periphery 60. It may have a central hole 66 with rounded edges large enough for a finger or thumb. This handle is easy to hold with one hand, sometimes with fingers spread over the center, or with two hands. FIG. 3 handle is preferred due to the open internal shape which allows the handler's hand to change positions easier and faster.

Figure 5A:
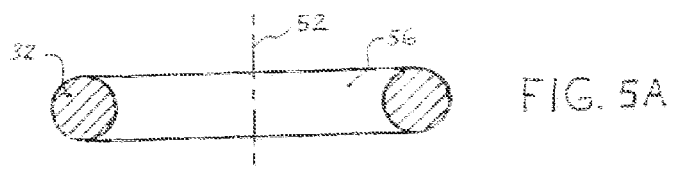
FIG. 5A shows a crosssection of FIG. 3 handle.
Figure 5B:
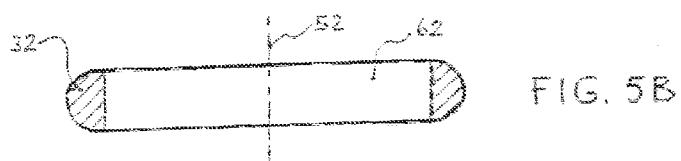
FIG. 5B shows a crosssection of FIG. 4A handle.
Figure 5C:
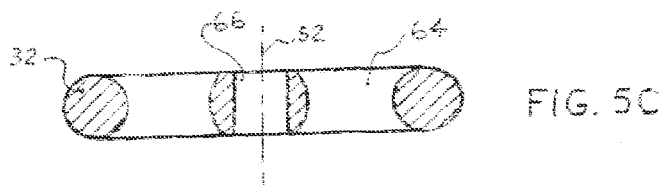
FIG. 5C shows a crosssection of FIG. 4B handle.

FIG. 5A, 5B, 5C show the preferred crosssectional shape for FIGS. 3, 4A and 4B handles. It is circular for all three. It is a crosssection that is commonly used for dog and many other handles for its combination of comfort and strength. A comfortable diameter commonly used for handles is 0.75 to 1.125 inches. Other good crosssectional shapes are elliptical (for its comfort) and rectangular flat with well-rounded edges (for ease of manufacturing and for making a stronger, double or triple plated handle) or anything in-between that provides a comfortable grip. Smooth shapes, surfaces and rounded edges are needed for comfortable holding and handling, and for hand(s) and leashes in contact with or sliding over the handle.

FIG. 6A, 6B, 6C, 6D show plan views of a single entanglement and resolution. FIG. 6A shows a plan view of a handler 68 holding handle 32 with arm 34 and hand 36 and leashes and dogs as in FIG. 1 without any entanglements. FIG. 6B shows a plan view of a single entanglement of leash 38L crossed over leash 38M. FIG. 6C shows the 180 degree rotation required of leash attachment 40L over and around the shown rotation axis and perpendicular 54R to untangle leashes 38L and 38M. This is the same as rotating leash attachment 40M 180 degrees under and around this rotation axis 54R. FIG. 6D shows the untangled state with the new leash order 38M38L38R (and dog order 30M30L30R not shown) as viewed from above from left to right from the handler.

Figure 7A:
FIGS. 7A, 7B, 7C, 7D show plan views of multiple entanglements and resolution.
Figure 7B:
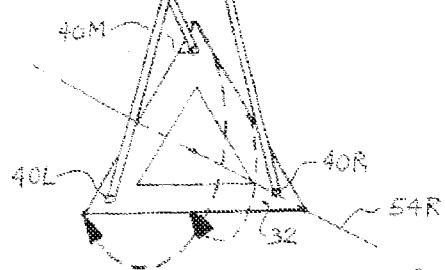
Figure 7C:
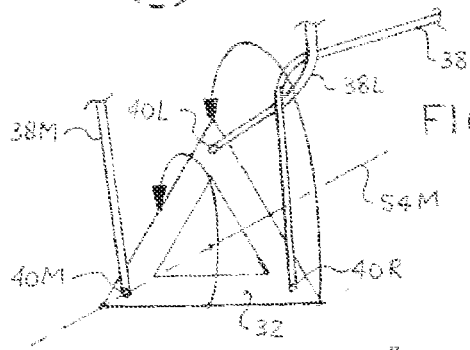
Figure 7D:
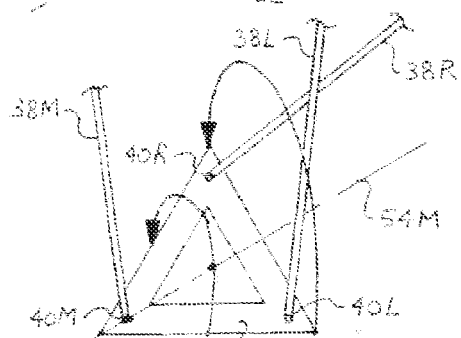

FIG. 7A, 7B, 7C, 7D show plan views of multiple entanglements and resolution. FIG. 7A shows leash 38L crossed over leash 38M, crossed under leash 38R, then crossed over leash 38R (three entanglements). The first untangle rotation is shown in dash lines which moves leash attachment 40M 180 degrees under and around the rotation axis 54R. This untangles leash 38M from 38L. FIG. 7B shows the second 180 degree rotation. It moves 40R with leash 38R over and around rotation axis 54M, which removes the entanglement of leash 38L that was under leash 38R. FIG. 7C shows the third and last 180 degree rotation. It moves 40L with leash 38L over and around rotation axis 54M, which removes the last entanglement which was 38L over 38R. FIG. 7D shows the untangled state with final leash order 38M38L38R (and dog order 30M30L30R not shown) as viewed from above from left to right from the handler. As there were three 180 rotations, the handle's starting top side is now facing down.

Figure 8A:
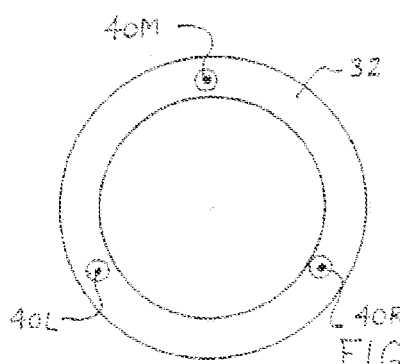
FIGS. 8A through 8S are plan views of other three dog handles (FIG. 8P is intentionally left blank).
Figure 8B:
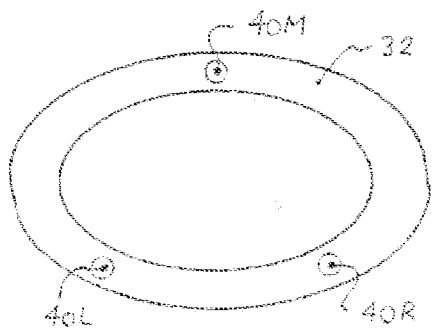
Figure 8C:
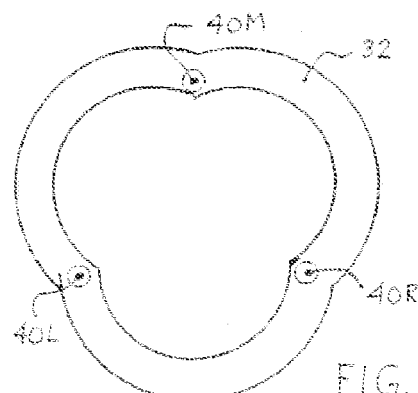
Figure 8D:
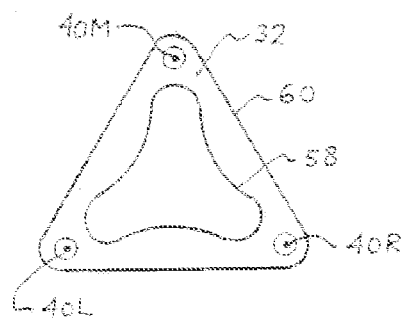
Figure 8E:
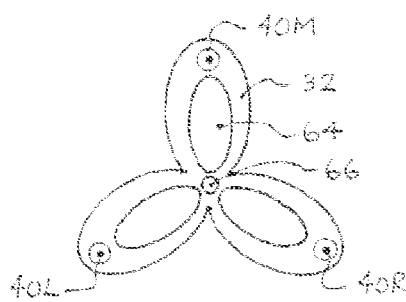
Figure 8F:
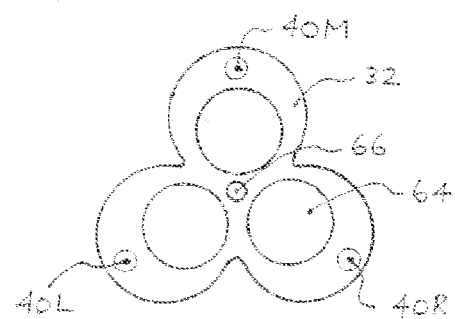
Figure 8G:
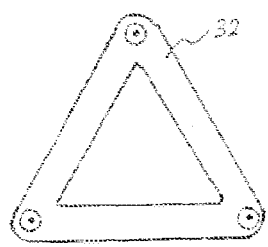
Figure 8H:
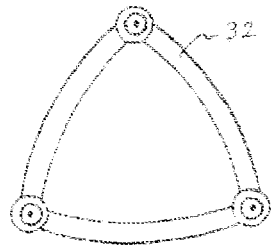
Figure 8I:
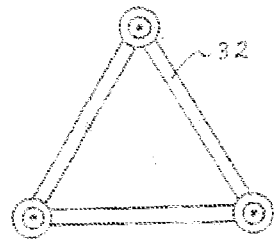
Figure 8J:
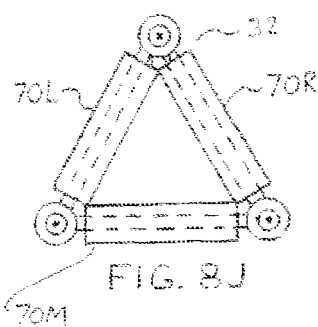
Figure 8K:
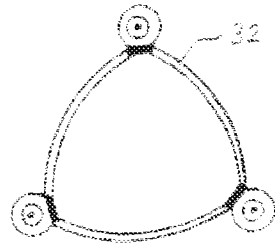
Figure 8L:
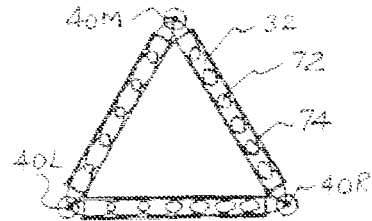
Figure 8M:
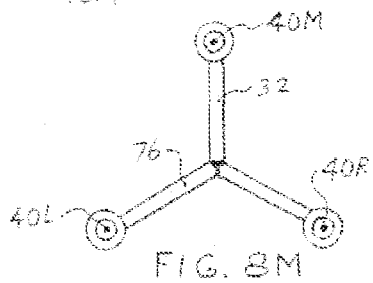
Figure 8N:
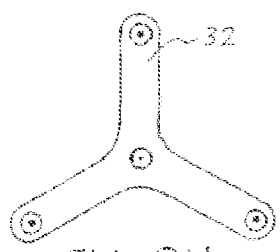
Figure 8O:
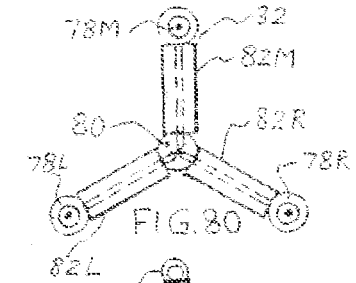
Figure 8Q:
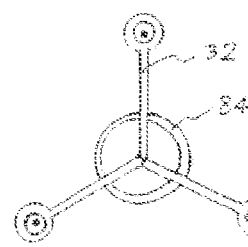
Figure 8R:
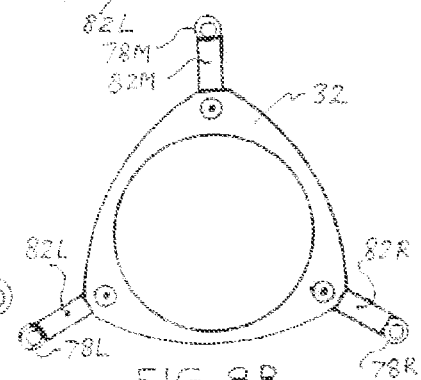
Figure 8S:
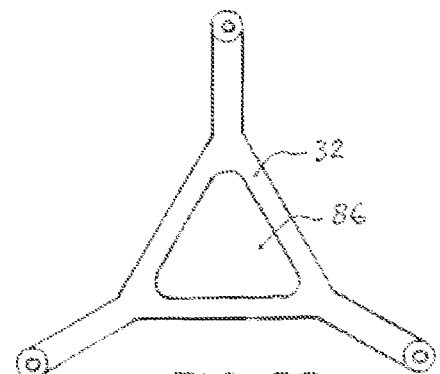

FIGS. 8A through 8S (8P intentionally left out) show plan views of three dog handles other than the preferred embodiments shown in FIGS. 3, 4A and 4B. They all show advantageous tri-symmetrical configuration and include three graspable portions or grips. These handles 32 have the equilateral triangular pattern 40L40M40R drawn on the same scale, except as noted. The crosssectional shape can be anything from circular to elliptical to rectangular with rounded edges. The handle can consist of a single part, three identical segments or two identical halves with the midplane in-between the top and bottom sides. Each side or arm can have a fixed or rotatable grip around it or the grip can be continuous. The shown configurations are all usable, and illustrate that many different configurations are possible while still maintaining the equilateral triangular leash attachment pattern. Solid 2D or 3D handles without a central opening for the hand are not recommended as they are not easy to hold and rotate. Handles can have adjustable or variable length sides or arms, openable holes or openings with safe closure features, more than one hole or attachment location at or near each triangle vertex or in the sides or arms of the handle, or the leash attachment openings can be slots or have a variable location, etc.

FIG. 8A shows handle 32 with a circular inner and outer periphery (torus). FIG. 8B shows handle 32 with an elliptical inner and outer periphery. FIG. 8C shows handle 32 with small radius circular arcs for inner and outer periphery. FIG. 8D shows handle 32 with inner periphery 58 and triangular outer periphery 60. FIG. 8E shows handle 32 with an interconnected three leaf configuration where each of the three inner holes 64 is elliptical and large enough for the hand of the handler. FIG. 8F shows a handle 32 as FIG. 8E but this one has three circular inner holes 64. FIG. 8G shows handle 32 with a simple triangular inner and outer periphery. FIG. 8H shows handle 32 as FIG. 8G but comprised of 3 separate and connected curved links FIG. 8I shows handle 32 as FIG. 8H with 3 straight rods welded together at the leash attachment rings or eyelets. FIG. 8J shows the handle 32 of FIG. 8I with fixed or rotatable grips 70L, 70M and 70R. FIG. 8K shows a handle 32 of metal curved rods welded to leash attachment rings. FIG. 8L shows a handle 32 made of a continuous chain 72 within a protective rigid, semirigid or flexible cover or grip 74 and an end connector. It could also be three equal length chain segments connected to each other and to the leashes at the vertices 40L, 40M, 40R. FIG. 8M shows an open trispoke handle 32 with welded spokes 76 and welded end rings at leash attachment locations 40L, 40M and 40R. FIG. 8N shows a similar open triblade handle 32 that is simple and a single part. FIG. 8O shows another trispoke handle 32 comprised of three long eye screws 78L, 78M, 78R screwed into a central ball 80. It has fixed or rotatable handgrips 82L, 82M, 82R. FIG. 8Q shows the trispoke handle of FIG. 8M with an additional ring 84 (or 3 segments) welded to the handle to facilitate holding and handling FIG. 8R shows a larger scale combination handle 32 made by merging a trispoke shape and a closed shape as FIG. 4A handle. It has 3 eye screws 78L, 78M, 78R screwed into the handle as the three spokes. The spokes have rotatable handgrips 82L, 82M, 82R. FIG. 8S is a scaled up trispoke/closed shape combination handle 32 as FIG. 8R but it is a single part with a central triangular opening 86.

FIGS. 9A through 9F show three dog handles 32 that have rotatable components, each of which can rotate around a rotation axis of the triangle to make the untangling rotations a little faster when two leashes are entangled several times in the same direction. Instead of turning the handle over 180 degrees each time, the handler can hold one corner of the handle and rotate the other two leash ends around that corner's rotation axis as many times as needed. These handles are more expensive to manufacture and the connecting parts can fail. The preferred embodiments of FIGS. 3, 4A and 4B handles have no moving or connector parts.

Figure 9A:
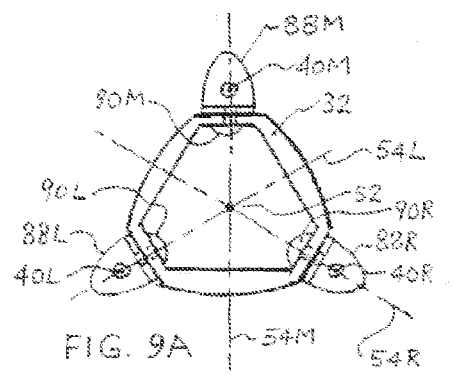
FIGS. 9A through 9F are plan views of three dog handles that have rotatable parts.
Figure 9B:
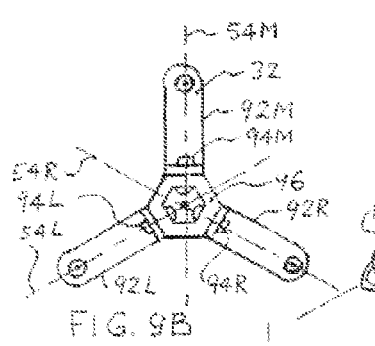

FIG. 9A shows a handle 32 with short rotatable tips 88L, 88M, 88R connected to the handle with short bolts 90L, 90M, 90R. These tips can rotate around the bolts which centerlines are aligned with the triangle's rotation axes 54L, 54M, 54R. Instead of rotatable tips, these could be rotatable balls. FIG.

Figure 9C:
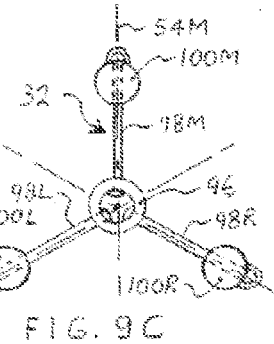
Figure 9D:
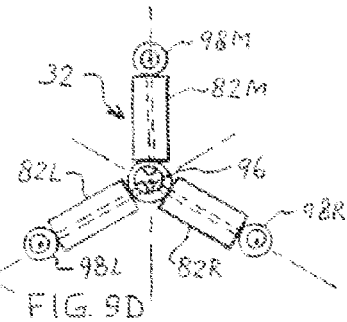
Figure 9E:
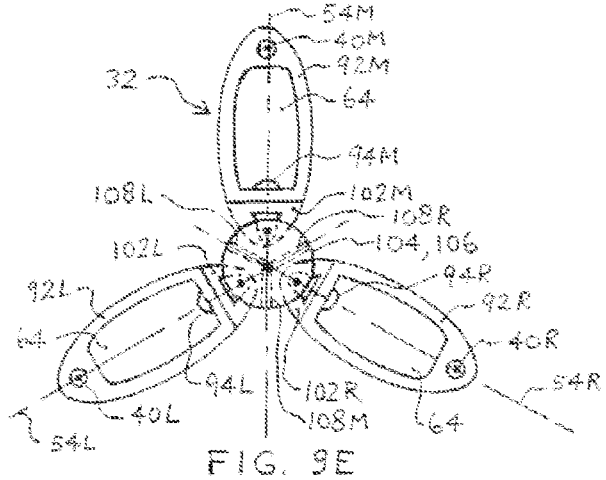

9B shows a similar but tribladed handle 32 with long blades 92L, 92M, 92R that are rotatable around connecting bolts 94L, 94M, 94R that are also aligned with the triangle's rotation axes. The blades are bolted onto a central connecting shape 96. FIG. 9C has a trispoke handle with rotatable eye bolts 98L, 98M, 98R connected to a central shape 96 and balls 100L, 100M, 100R rotatable around the eye bolts. FIG. 9D has a trispoke handle with rotatable handgrips 82L, 82M, 82R on rotatable eyebolts 98L, 98M, 98R respectively that are mounted into a connecting shape 96. FIG. 9E is a large-scale and more complex handle that has many parts. The handle 32 has three leaves or blades 92L, 92M, 92R that are rotatable around the triangle's rotation axes 54L, 54M, 54R respectively. Each blade has a large opening 64 for the handler's hand. The blades are connected to small triangular connector parts 102L, 102M, 102R with short bolts 94L, 94M, 94R. These connectors can rotate approximately 30 degrees each way around an axis normal to the plane of the handle and in-between two circular plates 104 and 106. Their travel is restricted by stops 108L, 108M, 108R respectively. Although these rotatable components facilitate rotations of the handle, they are not deemed worth the cost.

Figure 9F:
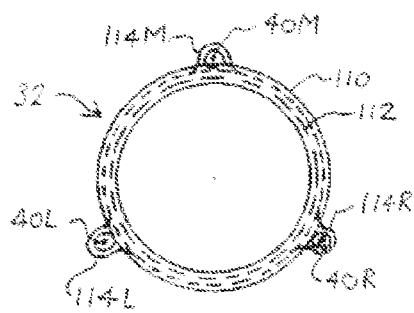

FIG. 9F shows spool 110 with a U-shaped or near circular profile, and with a chain or ring or cable 112 in its U-shaped open groove around it, with 3 attachment rings 114L, 114M, 114R for the leashes. The pulling forces from the dogs can rotate the chain or ring around the spool. The handler's hand is on the spool and the spool can rotate relative to the chain or ring or cable that holds the leashes. This spool may also be a torus with three spaced apart sliders attached in its side, each slider being allowed to travel in elongated slots in the outside of the torus.

Figure 10:
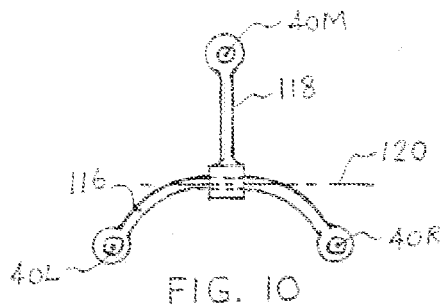
FIG. 10 shows a plan view of a handle having a fully rotatable arm.

FIG. 10 shows a plan view of a three dog handle that has one fully rotatable arm. This is an unusual handle that has a fixed arm 116 with leash attachment locations 40L and 40R, and a rotatable arm 118 with leash attachment 40M that can rotate 360 degrees around the rotation axis 120. This configuration is an example of a variable triangular arrangement. Instead of a rotatable arm, the arm could be a slider with one slider end movable in an all-around groove in the middle of the fixed arm.

Figure 11:
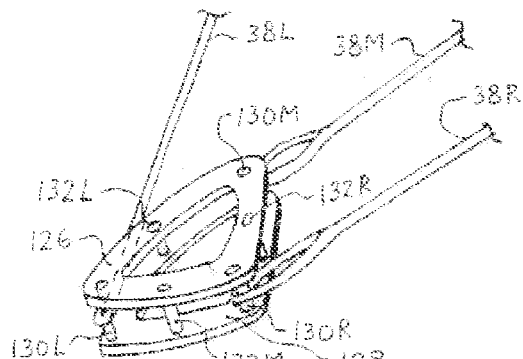
FIG. 11 shows a perspective view of a double three dog handle configuration.
Figure 12:
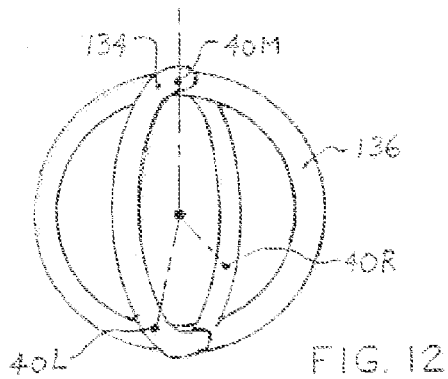
FIG. 12 shows an example of a handle in one of many possible 3D configurations.

FIG. 11 shows a perspective view of a double three dog handle configuration. This shows that two or more handles can be assembled in a stacked fashion with or without spacers in-between, for instance to make a very strong handle or to securely bolt retractable leashes in-between. In this example two identical closed shape handles 126 and 128 are bolted together with bolts 130L, 130M, 130R at the leash attachment locations 40L, 40M, 40R respectively, and with stops 132L, 132M, 132R in the middle of each side preventing the leashes from getting jammed in the handle. The handles are relatively flat and the space between them is large enough for the leashes but is kept small enough to still provide a comfortable grip FIG. 12 shows an example of a three dog handle in one of many possible 3D configurations. Leash attachments 40L, 40R, 40M form the equilateral triangle on a ring 134. A ring 136 mounted on ring 134 is an example of a 3D feature. Both rings can be held by the handler to hold and rotate the handle. Many 3D shapes are possible, including spherical shapes with holes. The 3D features may sometimes be helpful in holding or rotating the handle. They make the handle more expensive to manufacture and may also hamper the movement of leashes and sliding of the leashes or the handler's hand over the handle.

Figure 13:
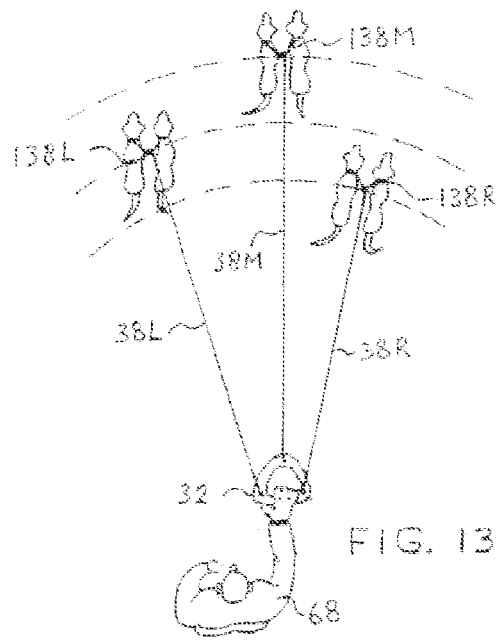
FIG. 13 shows a plan view of a handler walking 6 dogs using 3 couplers (3×2).

FIG. 13 shows a plan view of a handler 68 walking 6 dogs using 3 very short coupler leashes 138L, 138M, 138R. Staggering the three leash lengths a little, as shown with dash line arcs, may keep the teams more separated while walking. For this setup to work, the coupler leashes must be so short that none of the dogs on a team can get its coupler leash entangled with a coupler leash of a dog on another team. The coupler's top swivel will untangle the two leashes of the same team. Main leashes 38L, 38M, 38R are untangled the usual way via rotations of handle 32.

Figure 14:
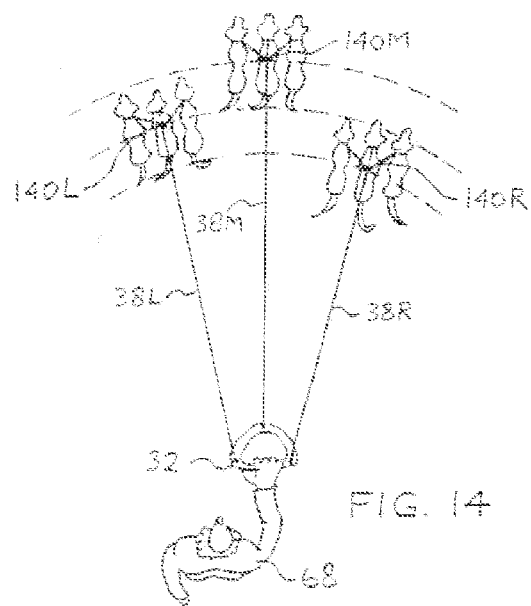
FIG. 14 shows a plan view of a handler walking 9 dogs using 3 triplers (3×3).

FIG. 14 shows a plan view of a handler 68 walking 9 dogs using 3 triplers. Each leash has a team of 3 dogs connected together by a very short tripler leash 140L, 140M, 140R. Staggering the three leash lengths a little, as shown with dash line arcs, may keep the teams more separated while walking. For this setup to work, the tripler leashes must be so short that none of the dogs on a team can get its tripler leash entangled with a tripler leash of a dog on another team or on the same team. Main leashes 38L, 38M, 38R are untangled the usual way via rotations of handle 32.

Figure 15:
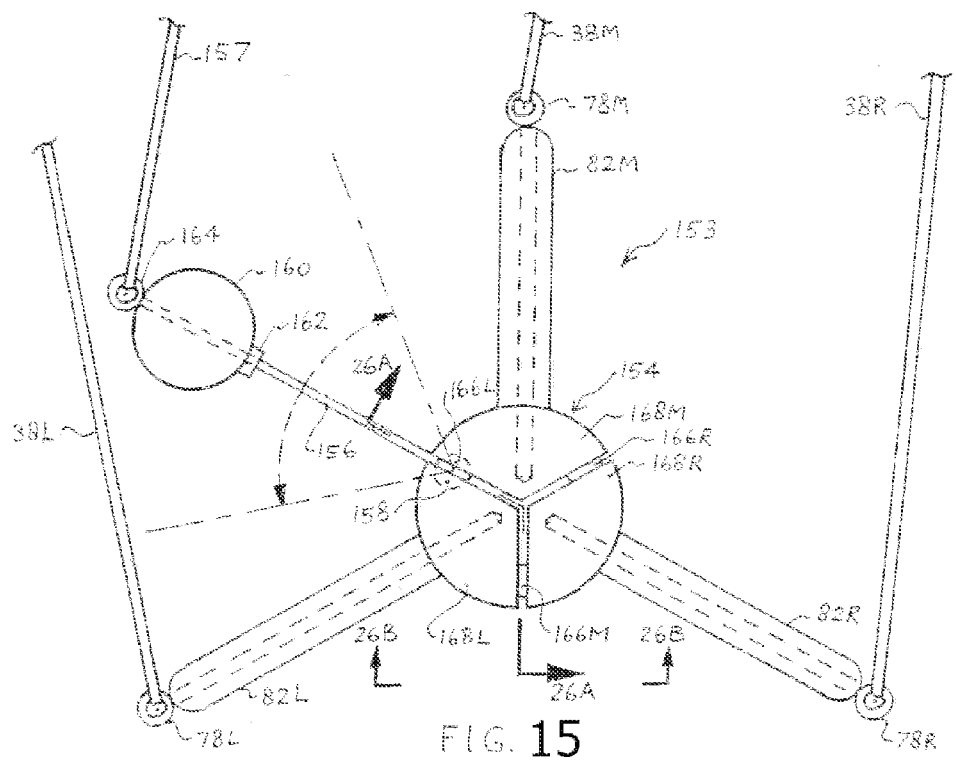
FIG. 15 is a plan view of an embodiment of a four dog handle.

FIG. 15 shows a plan view of the preferred embodiment of the four dog handle 153. It preferably has a 3 spoke configuration with eye screws 78L, 78M, 78R screwed into a central ball 154. The spokes have rotatable or fixed grips 82L, 82M, 82R around the eye screws. This is similar to the three dog handle shown in FIG. 8O. The four dog handle 153 has an additional lever or rod or joystick-like member 156 that is movable over and along the handle. It is used by the handler to manipulate the leash/leash end 157 of the fourth dog in untangling operations. The lever 156 has a small ball 158 at one end and a large ball 160 for the handler's hand with a holding nut 162 and an eyelet 164 for the fourth leash at the other end. Ball 158 can slide in any of three interconnected circular grooves 166L, 166M, 166R in central ball 154 and around the ball from top to bottom or from bottom to top and switch at the top or bottom to any of the other grooves. Central ball 154 is made out of three identical segments 168L, 168M, 168R, assembled spaced apart with a gap slightly wider than the diameter of lever 156 and small enough to contain ball 158. Other four dog handle configurations are possible.

Lever 156 with small ball 158 can be moved 360 degrees around and either under or over around and past any of the other three leash/leash end attachments 38L, 38M, 38R individually for untangling. It can be 'parked' in the grooves' junction center at the top or bottom side of ball 154 between untanglements. Each parking spot can have a small local dip or void to keep lever 156 at that location better but is not deemed necessary. By using a spherical shape for ball 154, the grooves are kept as short and smooth as possible. That way the time to rotate lever 156 from top to bottom or vice versa or around any one of the three fixed leash attachments for untangling is kept shortest. The grooves with throats keep the lever with small ball 158 connected to the handle. The throat of the grooves is preferably wide enough so that the lever can rotate around the groove's center either way in the plane of the handle roughly up to +/40 degrees, from the position as shown, in the direction of any two spokes. In addition, the distance from the center of eyelet 164 to the center of central ball 154 is roughly 0.5 to 2.5 inches larger than the distance from a fixed eyelet center on a spoke to the center of central ball 154. Both measures facilitate the motion of the lever and the untangling of the fourth leash around any of the other three leashes.

If leash 157 of the fourth dog gets entangled with another leash, crosses over leash 38M, then lever 156 with leash 157 is moved up from the shown position as drawn (if it was there) along groove 166L to the top of central ball 154 and then half way down along groove 166R which would amount to a 180 degree rotation which untangles. If it needs more as judged from the two leash positions, then lever 156 can be moved more, for example to the bottom junction and past it for a 360 degree rotation. Multiple entanglements of leash 157 will require at least a 180 degree rotation of lever 156 per entanglement. If any of the three fixed leashes gets entangled between themselves, the handle is rotated as usual to untangle. A rotation of the handle may be blocked by leash 157. In that case lever 156 with leash 157 is moved in the right groove either to the bottom or the top of the central ball 154 to unblock. If any of the three fixed leashes gets entangled with leash 157, lever 156 is moved to untangle.

Circular grooves fully inside central ball 154 are preferred over partial grooves or channels in the surface with a separate cover, or tracks on the ball, or any other guides that allow ball 158 to slide along the handle. Grooves could be made along the spokes of a wheel type handle and/or along the periphery of a wheel type or other closed shape handle. Grooves could also be machined in a different pattern, for example with interconnected circles around each spoke. Many variations are possible but the central ball with three grooves as shown in the preferred embodiment are deemed to provide the shortest and smoothest motion paths for the handler.

Figure 16A:
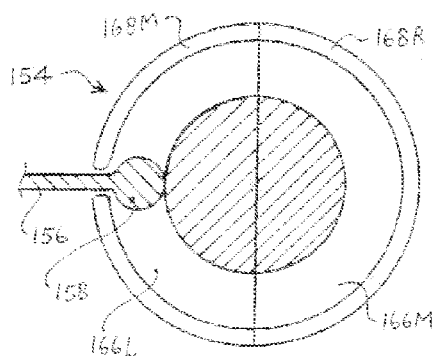
FIG. 16A is a crosssection through the central ball of the four dog handle.
Figure 16B:
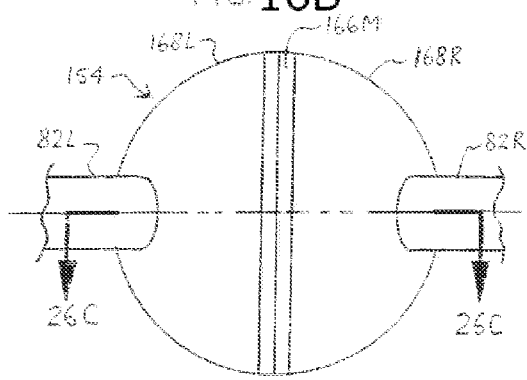
FIG. 16B is a side view of the central ball of the four dog handle.
Figure 16C:
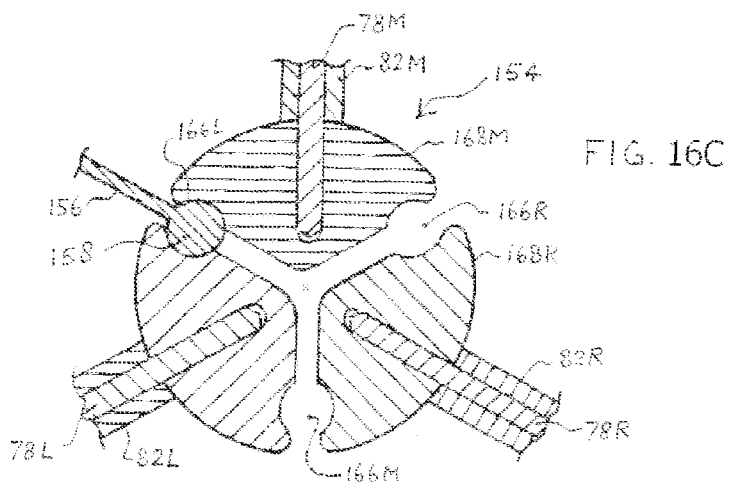
FIG. 16C is a crosssection through the central ball of the four dog handle.

FIG. 16A is a crosssectional view through central ball 154 of four dog handle 153, showing circular groove 166L and 166M, and lever 156 with small ball 158. FIG. 16B is a side view of central ball 154 area, looking towards groove 166M. FIG. 16C is a crosssectional view through central ball 154 of the four dog handle. It shows the three identical segments 168L, 168M, 168R that make up the ball. These segments are connected together with 6 screws (not shown). Two screws between any two segments are located between the groove and the ball's center just above and below the eye screw spoke. Each segment has two outgoing screws to the next segment and two incoming screws from the next segment. Each segment is thus connected by four screws to the next segment making for a sturdy triangular connection pattern for the central ball, ensuring that small ball 158 will stay in grooves 166L, 166M, 166R at all times. The identical segments can be manufactured separately with one tool, or full grooves can be made in the central ball with a ball end router and then the ball is split in three identical 120 degree segments. The segments are assembled and kept spaced apart with four spacers (not shown) around the connecting screws between each set of two segments. The spacer length is equal to the gap distance required for the diameter of movable lever 156. Ball 158 is enclosed before assembling the three segments.

Figure 17A:
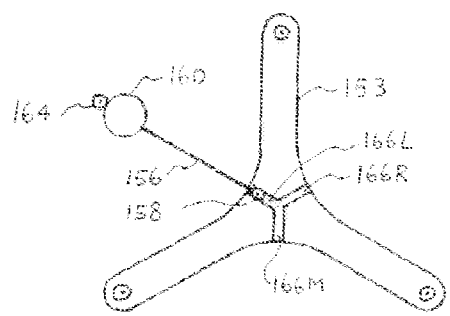
FIG. 17A is a plan view of another embodiment of a four dog handle.
Figure 17B:
FIG. 17B is a side view of the FIG. 17A embodiment.

FIG. 17A is a plan view of another (scaled down) embodiment of a four dog handle. This handle 153 has a single part three dog handle configuration such as shown earlier in FIG. 8N but has a central bulge 170 in which the three interconnected grooves 166L, 166M, 166R are machined with a ball end router. Lever 156 with ball ends is the same as in the preferred embodiment of FIG. 15. The top or bottom junction has a large enough opening for ball 158 to be inserted at assembly and the opening is then partially closed with 3 small plates leaving a wide enough channel between the 3 plates for the lever 156 to pass. FIG. 17B is a side view of FIG. 17A handle 153, looking into groove 166M and bulge 170.

Figure 18A:
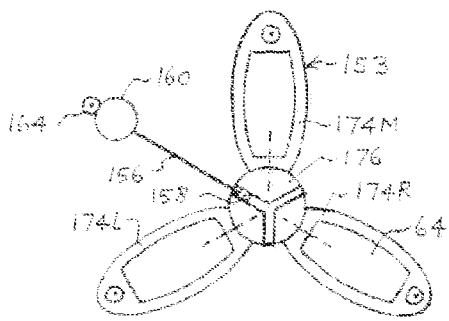
FIG. 18A is a plan view of another embodiment of a four dog handle.
Figure 18B:
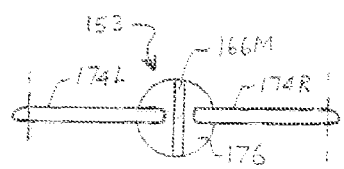
FIG. 18B is a side view of the FIG. 18A embodiment.

FIG. 18A is a plan view of another embodiment of a four dog handle. The configuration is similar to the three dog handle shown in FIG. 9E. It has three fixed leaves 114L, 114M, 114R, each having a large central hole 64 for the handler's hand. The leaves are firmly bolted to a central ball 176 that is configured with grooves in the same way as central ball 154 of the preferred embodiment shown in FIGS. 15, 16A, 16B, 16C. Lever 156 with the two ball ends 158 and 160 is also configured as in the preferred embodiment. FIG. 18B is a side view of the FIG. 18A handle looking into groove 166M and showing leaves 114L, 114R and central ball 176.

Figure 19A:
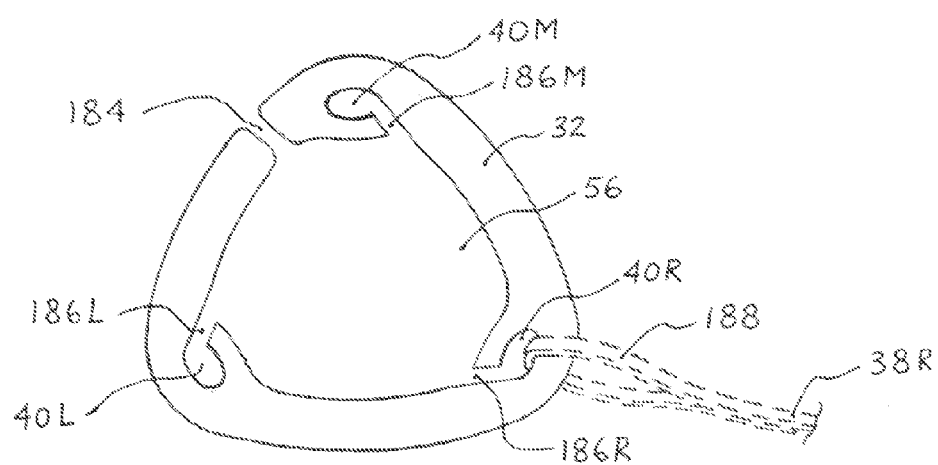
FIGS. 19A and 19B are plan views of alternate handle embodiments.

FIG. 19A shows a plan view of a three dog handle 32 with a central opening 56 that extends to the outer edge of the handle with opening 184. Any of the three leashes can be attached to the handle by looping the hand loop of the leash through opening 184 and moving the hand loop to and through its access slot 186L, 186M, 186R respectively into its leash attachment hole 40L, 40M, 40R respectively. For illustration, hand loop 188 of right leash 38R is shown in its attached position in leash attachment hole 40R. This configuration allows easy attaching and detaching of leashes that do not have a quick-release clasp in their hand loop. Opening 184 and the three access slots are configured so as not to allow a leash to inadvertently slide out.

Figure 19B:
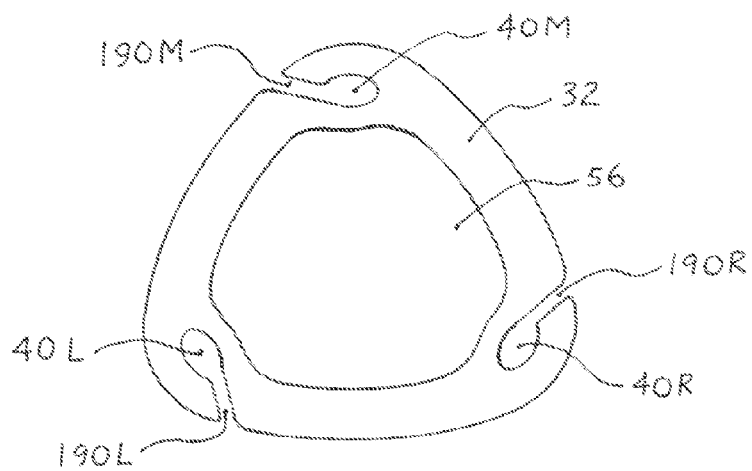

FIG. 19B shows a plan view of a three dog handle 32 with a central opening 56 wherein the access slots 190L, 190M, 190R are open from the outer perimeter of the handle to the leash attachment holes 40L, 40M, 40R respectively. This configuration also allows easy attaching and detaching of leashes that do not have a quick-release clasp in their hand loop. In this case no opening is needed from the central opening to the outer edge of the handle. The three access slots are configured so as not to allow a leash to inadvertently slide out.

Usage Combinations for Walking 2 to 12 Dogs
(using single leashes, couplers, triplers, three dog handles, four dog handles)
Ranked in Order of Preference:
2 Dogs Coupler with swivel near the handle, then two leashes
    Three dog handle with two dogs, two leashes
    One leash, then Coupler with swivel at the lower end of the leash
    Two single leashes
3 Dogs Three dog handle with three leashes
    One leash plus tripler with swivel at lower end of leash
    Coupler with swivel near the handle, then two leashes, plus a single leash
4 Dogs Four dog handle with four leashes
    Three dog handle plus one single leash
    Three dog handle with three leashes; one leash having a coupler at its end
5 Dogs Four dog handle, with 1 coupler on fixed triangle
    Three dog handle, with 2 couplers
    Three dog handle, with 1 tripler
6 Dogs Three dog handle, with 3 couplers
    Three dog handle, with 2 triplers
    Four dog handle, with 2 couplers on fixed triangle
    Four dog handle, with 1 coupler and 1 tripler on fixed triangle
7 Dogs Three dog handle, with 2 triplers
    Four dog handle, with 1 coupler and 1 tripler on fixed triangle
    Four dog handle, with 3 couplers on fixed triangle
8 Dogs Three dog handle, with 1 coupler and 2 triplers
    Four dog handle, with 2 couplers and 1 tripler on fixed triangle
    Four dog handle, with 4 couplers
    Four dog handle, with 2 triplers on fixed triangle
9 Dogs Three dog handle, with 3 triplers
    Four dog handle, with 1 coupler and 2 triplers on fixed triangle
    Four dog handle with 3 couplers, and 1 tripler on fixed triangle
10 dogs Four dog handle, with 3 triplers on fixed triangle
    Three dog handle, with 3 triplers and one single leash 11 Dogs Four dog handle, with 3 triplers on fixed triangle, and 1 coupler
12 Dogs Four dog handle, with 4 triplers The embodiments described in this application are not the only possible ones for the three dog and four dog handle. There are many alternative ways in which a handle can be configured with the triangular leash attachment pattern and with fourth leash provisions in the case of the four dog handle. Their methods of use can also be changed or adapted. Different materials, sizes, holes, connections, shapes, rotatable components, etc., can be used for the handle and/or components. While the descriptions and drawings contain many specifics, these should not be construed as limiting the scope of the invention, but merely serve to show preferred embodiments with a sample of possible alternative configurations.

I claim:

1. An apparatus for walking dogs on three leashes by a user and for untangling crossed leashes while walking, the apparatus comprising:
   one handle only, the handle having three leash attachment locations, with at least two of the leash attachment locations having attached thereto a leash leading to a dog, the three locations being roughly the vertices of a triangle;
   three handle grips each graspable by a hand of the user, each respective handle grip interposed between two of the three leash attachment locations.

2. The handle of claim 1 wherein the handle is a configuration having at least one central opening.

3. The handle of claim 2 wherein the at least one central opening extends at least partially to an edge of the material.

4. The handle of claim 1 wherein each of the three graspable handle grips is roughly rod shaped.

5. The handle of claim 1, the handle having a shape selected from the group of shapes consisting at least roughly of circle, triangle, trispoke and trefoil shapes.

6. The handle of claim 5 wherein the shape of the handle is roughly a triangle, each of the vertices of the triangle roughly congruent with one of the three leash attachment locations.

7. The handle of claim 6 wherein the handle is a configuration having at least one central opening.

8. The handle of claim 6 wherein the handle shape is roughly an equilateral triangle and each of the three leash attachment locations is at a vertex of the triangle.

9. The handle of claim 1 wherein, regardless of the shape of the handle, or the positioning of the leash attachment locations on the handle, three lines connecting the three leash attachment locations form the sides of a triangle.

10. The handle of claim 1 wherein the attachment locations form a pattern and that pattern shape is roughly that of an equilateral triangle.

11. The handle of claim 1 further comprising three leashes, one leash at each of the three leash attachment locations, each leash leading to a dog.

* * * * *